US011575704B2

(12) United States Patent
MacLeod et al.

(10) Patent No.: US 11,575,704 B2
(45) Date of Patent: Feb. 7, 2023

(54) REAL-TIME DETECTION OF AND PROTECTION FROM MALWARE AND STEGANOGRAPHY IN A KERNEL MODE

(71) Applicant: Cyemptive Technologies, Inc., Woodinville, WA (US)

(72) Inventors: Stewart P. MacLeod, Woodinville, WA (US); Robert Pike, Woodinville, WA (US)

(73) Assignee: CYEMPTIVE TECHNOLOGIES, INC., Snohomish, WA (US)

( * ) Notice: Subject to any disclaimer, the term of this patent is extended or adjusted under 35 U.S.C. 154(b) by 289 days.

(21) Appl. No.: 15/993,426

(22) Filed: May 30, 2018

(65) Prior Publication Data
US 2018/0351969 A1 Dec. 6, 2018

Related U.S. Application Data

(60) Provisional application No. 62/512,659, filed on May 30, 2017.

(51) Int. Cl.
*G06F 11/00* (2006.01)
*H04L 9/40* (2022.01)
(Continued)

(52) U.S. Cl.
CPC ........ *H04L 63/145* (2013.01); *G06F 11/2038* (2013.01); *G06F 21/554* (2013.01);
(Continued)

(58) Field of Classification Search
CPC ............... H04L 63/145; H04L 63/0236; H04L 63/1416; G06F 21/566; G06F 21/554; G06F 11/2038
See application file for complete search history.

(56) References Cited

U.S. PATENT DOCUMENTS 7,441,153 B1 * 10/2008 Chitre .................... G06F 21/64
714/38.14
8,069,484 B2 11/2011 McMillan et al.
(Continued)

FOREIGN PATENT DOCUMENTS

JP 5996145 B1 9/2016
JP 2017068822 A 4/2017

OTHER PUBLICATIONS

PCT International Search Report and Written Opinion, PCT Application No. PCT/US18/35205, dated Sep. 20, 2018, 19 pages.
(Continued)

*Primary Examiner* — Shewaye Gelagay
*Assistant Examiner* — Carlton Johnson
(74) *Attorney, Agent, or Firm* — Fenwick & West LLP

(57) ABSTRACT

A method for real-time detection of and protection from steganography in a kernel mode comprises detecting transmission of a file via a firewall, an operating system, or an e-mail system. A size of the file is determined. From a file system, a stored filesize of the file is retrieved. The determined size of the file is compared to the stored filesize of the file. Responsive to the determined size of the file being larger than the stored filesize of the file, steganography detection analytics are executed on the file. Responsive to the steganography detection analytics indicating presence of steganography in the file, a steganography remediation action is executed, and information is transmitted describing the steganography to a client device.

20 Claims, 9 Drawing Sheets

(51) Int. Cl.
- *G06F 11/20* (2006.01)
- *G06F 21/55* (2013.01)
- *G06F 21/56* (2013.01)

(52) U.S. Cl.
CPC ........ *G06F 21/566* (2013.01); *H04L 63/0236* (2013.01); *H04L 63/1416* (2013.01)

(56) References Cited

U.S. PATENT DOCUMENTS

| | | | |
|---|---|---|---|
| 8,621,628 B2 | 12/2013 | Zeitlin et al. | |
| 8,650,638 B2* | 2/2014 | Ma | G06F 21/56 726/22 |
| 8,656,465 B1 | 2/2014 | Fong-Jones | |
| 8,918,427 B1 | 12/2014 | Searls et al. | |
| 9,386,034 B2 | 7/2016 | Cochenour | |
| 9,734,337 B1 | 8/2017 | Patton et al. | |
| 10,609,066 B1 | 3/2020 | Nossik et al. | |
| 2009/0038011 A1 | 2/2009 | Nadathur | |
| 2009/0044024 A1 | 2/2009 | Oberheide et al. | |
| 2009/0158430 A1* | 6/2009 | Borders | H04L 63/1408 726/23 |
| 2011/0209219 A1 | 8/2011 | Zeitlin et al. | |
| 2012/0255017 A1 | 10/2012 | Sallam | |
| 2013/0326625 A1 | 12/2013 | Anderson et al. | |
| 2015/0026464 A1* | 1/2015 | Hanner, Sr. | G06F 21/6209 713/168 |
| 2015/0058987 A1 | 2/2015 | Thure et al. | |
| 2015/0172300 A1 | 6/2015 | Cochenour | |
| 2015/0244679 A1 | 8/2015 | Diehl et al. | |
| 2016/0381054 A1* | 12/2016 | Agaian | H04L 63/1408 726/23 |
| 2017/0032123 A1 | 2/2017 | Carson | |
| 2017/0091482 A1* | 3/2017 | Sarin | H04L 63/1408 |
| 2017/0359306 A1 | 12/2017 | Thomas et al. | |
| 2018/0052720 A1 | 2/2018 | Ionescu et al. | |
| 2018/0307839 A1 | 10/2018 | Bhave et al. | |
| 2020/0193023 A1 | 6/2020 | Olarig et al. | |

OTHER PUBLICATIONS

"Towards Generic Ransomware Detection," Objective-See, Apr. 20, 2016, 25 pages [Online] [Retrieved on Jul. 24, 2018] Retrieved from the Internet<URL:https://objective-see.com/blog/blog_0x0F.html>.
Zeltser, L., "How Would You Detect and Impede Ransomware on an Endpoint?" Updated Oct. 31, 2017, 1995-2018, 6 pages, [Online] [Retrieved on Jul. 24, 2018] Retrieved from the Internet<URL:https://zeltser.com/detect-impede-ransomware/>.
PCT Invitation to Pay Additional Fees, PCT Application No. PCT/US18/35205, dated Jul. 23, 2018, 2 pages.
United States Office Action, U.S. Appl. No. 15/993,423, dated Aug. 13, 2020, 25 pages.
United States Office Action, U.S. Appl. No. 15/993,423, dated Apr. 29, 2020, 26 pages.
Intellectual Property India, First Examination Report, Indian Patent Application No. 201947049721, dated May 13, 2021, eight pages.
European Patent Office, Extended European Search Report, European Patent Application No. 18809684.6, dated Jan. 28, 2021, eight pages.
Japan Patent Office, Office Action, Japanese Patent Application No. 2019-566622, dated Sep. 28, 2021, nine pages.
Ruo, A. et al. "An Implementation of Secure Access Control on Windows OS Using Filter Driver." Proceedings of Computer Security Symposium 2009, vol. 2009, No. 11, pp. 123-128, (with English abstract).

* cited by examiner

REAL-TIME DETECTION OF AND PROTECTION FROM MALWARE AND STEGANOGRAPHY IN A KERNEL MODE

CROSS REFERENCE TO RELATED APPLICATION

This application claims the benefit of U.S. Provisional Application No. 62/512,659, filed May 30, 2017, which is incorporated by reference in its entirety.

TECHNICAL FIELD

This disclosure relates generally to detection of malware, and in particular to real-time detection of and protection from malware and steganography in a kernel mode.

BACKGROUND

Malware refers to malicious computer software programs, which may infect computers, tablets, or devices without the owner's knowledge or permission. Steganography is one such method to infect devices and networks with malware.

Malware may include viruses, worms, Trojans, botnets, spyware, and adware. Viruses replicate themselves after attaching to an executable program. Worms replicate themselves across a network to quickly infect a large number of devices. Trojans disguise themselves as legitimate software and attempt to steal the user's identification, password, and other personal information. Botnets are groups of infected devices that are remotely controlled. The individual bots (devices) can be instructed to send SPAM email or participate in denial of service attacks. Spyware is designed to capture keystrokes, credit card numbers, and other personal information. Adware infects a device and downloads and displays unwanted advertisements.

Traditional malware prevention tools may try to detect a signature and isolate and repair, or remove the malware. However, the number of malware programs has increased dramatically, and signatures are typically created only for known malware. Traditional signature-based approaches therefore are typically unable to identify or detect unknown malware.

Moreover, traditional approaches, based on run-time heuristic scanning using rules, may generate many false positives and false negatives. Other traditional approaches, based on sandboxing to execute suspicious files in a virtual machine and observe malicious behavior, are typically unable to detect malware that is able to determine if it is in a sandbox (virtual machine or container) and evade detection. Finally, traditional approaches, based on static code analysis, are also unable to detect malware reliably.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example block diagram of a system for real-time detection of and protection from malware and steganography in a kernel mode, in accordance with an embodiment.

DETAILED DESCRIPTION

Figure 1:
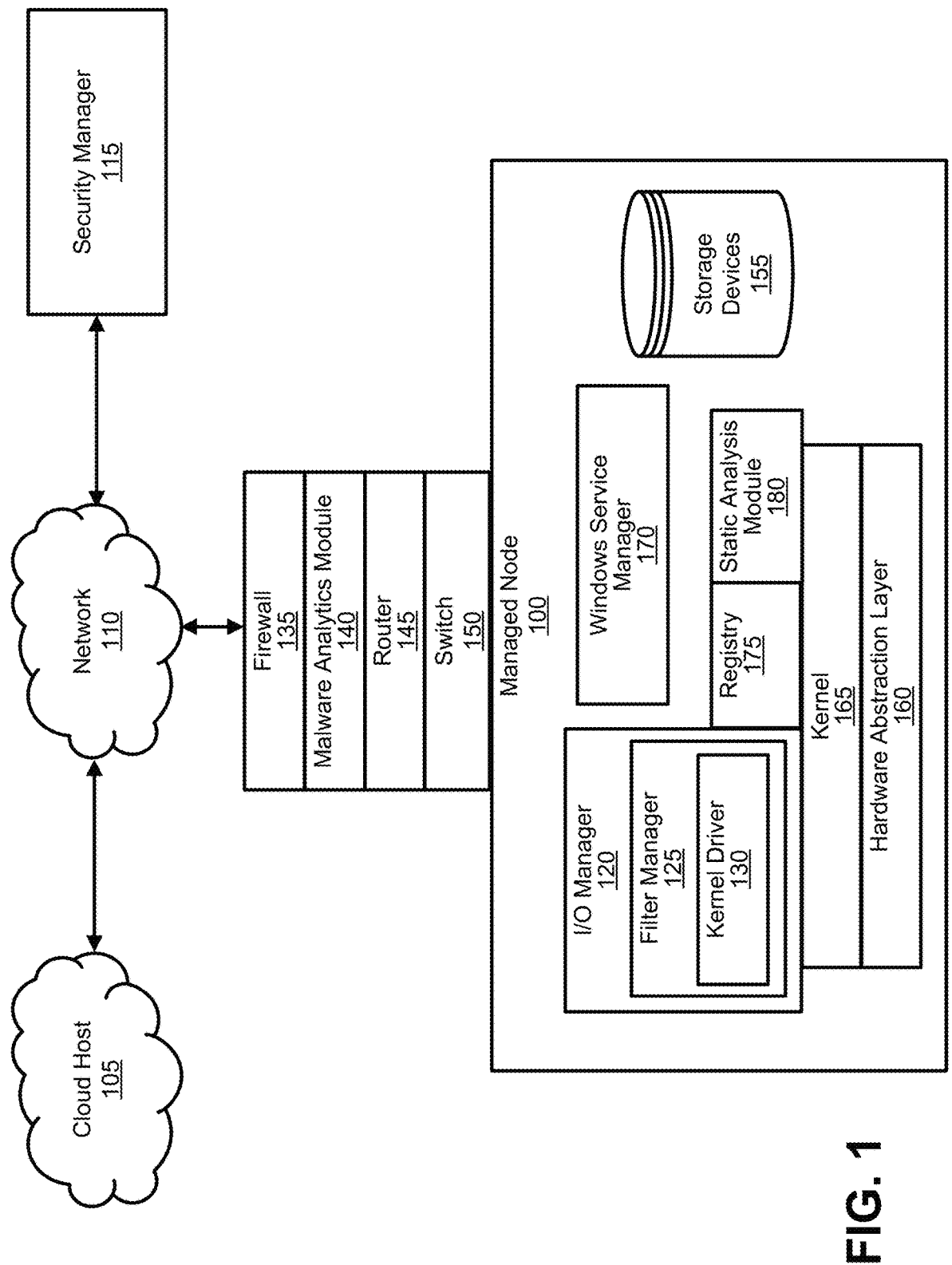

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

INTRODUCTION

Traditional security products may include behavioral analytics and run-time heuristics to protect devices from unknown malware by looking for suspicious application program interface (API) calls and actions. Malware refers to software that is intended to damage or disable computers and computer systems. Malware may include sophisticated programs to evade detection from security products by creating polymorphic and metamorphic malware. Polymorphic malware mutates by encrypting destructive code using a mutation engine that generates a new "signature" on different executions. Metamorphic malware dynamically restructures executable code to obfuscate malicious intentions. To evade detection, malware may add redundant processor opcodes, such as push, pop, nop, and jump instructions, to change an executable's signature but not affect its functionality.

Ransomware is a fast growing category of malware. Ransomware is a type of malware that infects a computer, tablet, device or smartphone with the goal of forcing the user "to pay a ransom" to regain access to their device or personal data. Some types of ransomware may lock a user device or system to prevent the user from access to their device or system. Other types of ransomware may encrypt the user's personal data, such as word processing documents, photographs, music, video, and email, using encryption software. In such cases, the user may be required to pay a ransom to regain access. Steganography is one such method to infect devices and networks with ransomware.

Steganography refers to the practice of concealing a computer file, message, image, or video within another computer file, message, image, or video. In digital steganography, electronic communications may include steganographic coding inside of a transport layer, such as a document file, image file, program or protocol. Media files may be used for steganographic transmission because of their size. For example, a sender might start with an innocuous image file and adjust the color of every hundredth pixel to correspond to a letter in the alphabet.

Traditional methods to detect ransomware may rely on detecting malware file signatures, run-time heuristic scanning, sandboxing, static code analysis, etc. However, traditional methods, based on detecting malware file signatures, may only detect previously identified malware and may not protect against new forms of ransomware, such as self-morphing ransomware. Traditional methods, based on run-time heuristic scanning, may use a set of rules to generate false positives and false negatives. Traditional methods, based on sandboxing, may execute suspicious files in a virtual machine and observe malicious behavior. However, ransomware may be able to determine if it is in a sandbox (virtual machine or container) and evade detection. Traditional methods, based on static code analysis, may attempt to disassemble the executable code and create a parse tree to identify suspicious API calls. However, such traditional methods, based on static code analysis, cannot detect ransomware reliably.

"Packed" malware and "hidden malware" is traditionally undetected and may pass through a local device's firewall, the network's firewall, and anti-virus software. Traditional firewall features such as filtering and deep packet inspection, intrusion protection systems, and application awareness are often used. However, traditional firewalls rely on a port assignment to identify malware. The link between the actual application type and the firewall's assumption of the application is therefore weak. Moreover, deep packet inspection is of limited value when the termination point is the destination and not the firewall due to strong encryption.

Configuration Overview

Disclosed by way of example embodiments are systems, methods and/or computer program products (e.g., a computer readable storage media that stores instructions executable by one or more processing units) for real-time detection of and protection from malware in a kernel mode. A processor in a computer may generally run in at least two different modes: user mode and kernel mode. Typically, applications may run in user mode, while core operating system components may run in kernel mode.

In one embodiment, a file operation request initiated by a process running in user mode is detected. Malware detection analytics are performed on a file buffer associated with the detected file operation request to detect behavior indicating presence of malware. Responsive to detecting the behavior indicating presence of the malware, the process responsible for initiating the detected file operation request is identified. A search for the identified process is performed on one or more of a blacklist of programs and a whitelist of programs to determine whether the identified process is a trusted process. Responsive to determining that the identified process is not a trusted process, a malware remediation action is executed against the identified process. Information describing the malware is transmitted to a client device.

The disclosed embodiments perform integrated real-time detection of security threats to protect devices, and networks, from malicious attacks and data loss. Static analysis may be performed to search for files potentially infected with malware using an array of tests to identify suspicious program instructions to decide if it is malware. Once detected, a unique sequence of bytes uniquely identifies the malicious software without requiring execution and differentiates it from legitimate programs. Dynamic analysis monitors the behavior of an application during execution to determine if it contains malware. In addition to identifying malware directly, the state of the system is monitored in real-time.

Since modern malware may be polymorphic or metamorphic, malware may evade detection by traditional antivirus software that use file signatures. One embodiment uses a unique state-based mechanism to detect if a file has been encrypted without authorization. The responsible process is identified, and isolated from other devices. This obviates the need to know the malware a priori. The changes in the state of data make identification of the malware quick and reliable. Integrated steganography detection identifies the presence of hidden data and malware from executing on the device. The system executes in-line on the firewall to prevent malware and files with hidden data from entering the network. Together it works as an integrated end-to-end system that leverages the strengths of static analysis, dynamic analysis, and system state changes to more accurately detect malware and with fewer false positives and fewer false negatives.

Disclosed further by way of example embodiments are systems, methods and/or computer program products (e.g., a computer readable storage media that stores instructions executable by one or more processing units) for real-time detection of and protection from steganography in a kernel mode. Transmission of a file via a firewall, an operating system, or an e-mail system is detected. A size of the file is determined. From a file system, a stored filesize of the file is retrieved. The determined size of the file is compared to the stored filesize of the file. Responsive to the determined size of the file being larger than the stored filesize of the file, steganography detection analytics are executed on the file. Responsive to the steganography detection analytics indicating the presence of steganography in the file, a steganography remediation action is executed. Information describing the steganography is transmitted to a client device.

The disclosed embodiments can protect many types of devices from both known and unknown malware and security threats by integrating a combination of analytics to identify unauthorized data encryption, data exfiltration, rootkit installations, and steganography. The system and method create an end-to-end solution to detect, isolate, analyze and remove malware faster, more accurately, with less computational overhead, and storage utilization compared to existing techniques. Real-time analysis of state changes to the file system enable real-time protection before the user's data is encrypted or deleted. The dynamic API monitoring heuristics, dynamic code analysis, the creation of tripwires and honeypots help discover suspicious behavior in near real-time.

The disclosed embodiments proactively check for tampering with the system configuration (MFT, MBR, Registry, and Windows Task Manager) and correct for malicious changes to ensure that the user has not been locked out. MFT refers to the Master File Table. MBR refers to the Master Boot Record. The Windows Registry is a hierarchical database that stores low-level configuration settings for the operating system and for information for applications, device drivers, Security Account Manager (SAM) and access to system performance counters. The Task Manager schedules execution of programs. A centralized and detailed logging system allows system administrators to manage all devices in their environment and provide the basis for a wide variety of data analytics.

The benefits and advantages of the disclosed embodiments include continuously scouring the system without knowledge of where ransomware is present. As part of the approach, the method may de-commission a server, e.g., DNS server. The result is an isolate-and-detect-a-change-in-state approach that is evidence of ransomware. Polymorphic ransomware can encrypt a payload in a container and change signatures that are undetectable by traditional methods. Metamorphic ransomware changes its signature by injecting meaningless machine instructions into the code. Instead of searching for known malware, the disclosed embodiments therefore look for state changes in the system. Further advantages and benefits include simplicity in using a blacklist of programs to identify malware. The disclosed embodiments therefore require low-maintenance because the disclosed system and its related databases or a third-party threat intelligence/service provider compiles and updates the blacklist of programs.

The disclosed embodiments may perform static state analysis (scan the disk) and real-time analysis. Malware signatures are not used but computations are performed to detect whether a file encrypted or not. Both read and write buffers inside the I/O request packet may be used. Therefore, no extra memory allocation or extra read/write operations are needed. There are no post-processing analytics, which need extra memory and computation. In another embodiment, the methods and system disclosed may be used to counter memory-based attacks, in which a file is stored in memory and not on the disk. In-memory monitoring of file allocations are performed and data that does not touch a disk may be scanned. The combination of statistical analytics on the device integrated in-line with the firewall provide strong protection for the network and devices.

Real-Time Detection of and Protection from Malware and Steganography in a Kernel Mode FIG. 1 illustrates an example block diagram of a system for real-time detection of and protection from malware and steganography in a kernel mode, in accordance with an embodiment. The system includes a managed node 100, a cloud host 105, and a security manager 115. In other embodiments, the system comprises additional or fewer components than those described herein. Similarly, the functions can be distributed among the components and/or different entities in a different manner than is described here.

The managed node 100 is the computer system that is to be protected from malware and steganography in a kernel mode. The managed node 100 may be a computer (e.g., running Windows, MacOS, or another operating system), a data center, a mainframe, or any other device having storage and computation capabilities. In one embodiment, the managed node 100 includes an I/O manager 120, a Windows service manager 170, a registry 175, a static analysis module 180, storage devices 155, a kernel 165, and a hardware abstraction layer 160. In other embodiments, the managed node 100 comprises additional or fewer components than those described herein. Similarly, the functions can be distributed among the components and/or different entities in a different manner than is described here.

In one embodiment, the managed node 100 is a Windows computer. The kernel driver 130 may be dynamically installed in the filter manager 125 inside the I/O manager 120. This embodiment provides a high-performance mechanism to intercept file system events on the Windows platform. In other embodiments, the managed node 100 takes advantage of a specific device's detection system capabilities. For example, the storage devices 155 in this example may be volumes formatted for the NTFS file system, FAT16, or FAT32.

The managed node 100 may include one or more devices that provide input and output (I/O) to and from the outside world. Such devices may include keyboards, mice, audio controllers, video controllers, disk drives, networking ports, and so on. In one embodiment, device drivers may provide the software connection between such devices and the operating system on the managed node 100. The kernel-mode I/O manager 120 manages the communication between applications and the interfaces provided by device drivers. Because devices may operate at speeds that may not match the operating system, the communication between the operating system and device drivers is primarily done through I/O request packets. These packets may be similar to network packets or Windows message packets. They are passed from operating system to specific drivers and from one driver to another.

In one embodiment, the I/O manager 120 detects file operation requests (e.g., read, write, file open, etc.) that are received by the managed node 100. The filter manager 125 may determine, from a file handle corresponding to the file operation request, whether the file operation request corresponds to an operation of interest. A file handle is a number or identifier that the operating system assigns temporarily to a file when it is opened. The operating system uses the file handle internally when accessing the file. If the filter manager 125 determines that the file operation request corresponds to an operation of interest, the filter manager 125 intercepts the file operation request for malware detection. If behavior is found that indicates the presence of the malware, the I/O manager 120 may identify the user mode process responsible for initiating the detected file operation request.

In one embodiment, the filter manager 125 is installed with Windows. It is activated only when a minifilter driver is loaded. A minifilter driver refers to a driver that filters file system operations. Minifilter driver may be located between the I/O manager 120 and the base filesystem. The filter manager 125 may attach to the file system stack for a target volume. A minifilter driver may attach to the file system stack indirectly, by registering with the filter manager 125 for the I/O operations that the minifilter driver chooses to filter.

In one embodiment, to intercept a file operation request, the filter manager 125 determines whether a minifilter driver is registered to intercept file operation requests. Responsive to determining that the minifilter driver is registered to intercept file operation requests, the filter manager 125 transmits the file operation request to the minifilter driver. Once a user process that is responsible for producing the file operation request has been identified by the I/O manager 120, the filter manager 125 may perform a search for the identified process on one or more of a blacklist of programs and a whitelist of programs to determine whether the identified process is a trusted process.

The kernel driver 130 executes in kernel mode as part of the kernel-mode operating system components that manage I/O, plug and play memory, processes and threads, and security, etc. Like the operating system itself, the kernel driver 130 may be implemented as a discrete, modular component that has a well-defined set of required functionalities. The kernel driver 130 may also supply a set of system-defined standard driver routines. The kernel driver 130 may intercept I/O request packets before and after execution. An I/O request packet is a kernel mode structure used by drivers to communicate with each other and the operating system. A minifilter kernel driver (illustrated and described below with respect to FIG. 3) supports routines for file operations. The kernel driver 130 is therefore a high-performance mechanism to receive and process file open, read, write, close, and other operations. In one embodiment, the kernel driver 130 accesses the kernel mode read and write buffer to perform rapid statistical analysis on the data that the process is requesting.

The Windows service manager 170 may be used to simplify common tasks related to Windows services. A Windows service is a computer program that operates in the background on the managed node 100 (similar to a daemon). A Windows service may be configured to start when the operating system is started and run in the background, or it may be started manually or by an event. The Windows service manager 170 can create services (both Win32 and Legacy Driver) without restarting Windows, delete existing services, and change service configurations. The Windows service manager 170 may have both GUI and command-line modes.

The registry 175 is a hierarchical datastore that stores low-level settings for the operating system and for applications that use the registry 175. The kernel 165, device drivers, services, and user interface can all use the registry 175. The registry 175 therefore contains information, settings, options, and other values for programs and the hardware abstraction layer 160. When a program is installed, a new subkey containing settings such as the program's location, its version, and how to start the program, are all added to the registry 175. The registry 175 may contain keys that are used by malware to schedule their execution after reboots.

In one embodiment, the static analysis module 180 may be a compile-time static verification tool that detects coding errors in programs and kernel mode driver code. A Windows service may monitor the state of the kernel driver 130 and perform proactive anti-malware tasks such as regularly verifying registry keys and values, searching for hidden processes, and performing system-wide static scans. The static analysis module 180 may manage system-wide scans that perform analytics on all files. This includes but is not limited to detecting encryption, identifying steganography, protecting against computer "lockouts," and monitoring the state of the Master File Table (NTFS MFT) and the Master Boot Record (MBR) for evidence of tampering. Also, the static analysis module 180 may use the Windows API to determine if the Volume Shadow Copy Service (VSS) (illustrated and described below with respect to FIG. 4) has been disabled from an unauthorized process. In an embodiment, if an unknown process is tampering with the VSS, the static analysis module 180 may detect that the unknown process is malware. The static analysis module 180 may then determine whether the unknown process is a system process to avoid false positives via management tools.

The storage devices 155 are components of the managed node 100 that store the data and applications on the managed node 100. The storage devices 155 may include RAM, cache, and hard disks, as well as possibly optical disk drives and externally connected USB drives. The storage devices 155 are formatted for a file system that controls how data is stored and retrieved. The file system used may include any of the NTFS file system, FAT16, FAT32, etc. The NTFS file system is a file system of the Windows NT family. File Allocation Table (FAT) is a computer file system architecture and a family of industry-standard file systems. The file system variants of FAT are FAT16 and FAT32.

The kernel 165 is a computer program that is the core of the managed node 100's operating system, having control over managed node 100. The kernel 165 is typically loaded on start-up (e.g., after the bootloader). The kernel 165 handles the rest of start-up as well as input/output requests from software, translating them into data-processing instructions for the processors of the managed node 100. The kernel 165 also handles memory and peripherals, such as keyboards, monitors, printers, and speakers.

The hardware abstraction layer 160 is a layer of programming that allows the managed node 100's operating system to interact with hardware devices (e.g., processor 310 described below with reference to FIG. 3) at a more general or abstract level rather than at a detailed hardware level. Hardware abstractions are software routines that emulate platform-specific details, giving programs direct access to the hardware resources. Using the hardware abstraction layer 160, device-independent, high performance applications may issue standard operating system calls to the hardware. For example, Windows 2000 is one of several operating systems that include a hardware abstraction layer.

The cloud host 105 provides hosting on virtual servers which pull their computing resource from extensive underlying networks of physical web servers. In one embodiment, the cloud host 105 may use virtual hardware, network, storage and composite solutions from a cloud vendor. The cloud hosting may be enabled through virtualization, whereby the entire computing capacity of an infrastructure or data center is distributed and delivered to multiple users or managed nodes simultaneously. For example, a physical server may be virtualized and consolidated to host several cloud servers, all sharing the processor, memory, storage, network and other resources. The cloud host 105 may perform machine learning algorithms, such as naïve Bayes classification, linear regression, logistic regression, and business intelligence analytics on the operation data. This information can be used to identify the scope of a malware attack, which devices are infected, and predict and prevent propagation.

The security manager 115 provides an enterprise-wide view of the managed node 100 and its policy. It is used to create, manage, deploy and monitor devices, virtual machines, and containers. The security manager 115 may also perform on-premise analytics. In one embodiment, an identified process that is responsible for initiating a certain file operation request may be determined to not be a trusted process. The security manager 115 may transmit a message to the managed node 100 to execute a malware remediation action against the identified process. The managed node 100 may also transmit information describing the malware to a client device.

The client device is an electronic device used by a user to perform functions such as consuming digital content, executing software applications, browsing web sites hosted by or otherwise interacting with the managed node 100 on the network 110, and downloading files. For example, the client device may be a smartphone or a tablet, notebook, or desktop computer. In addition, the client device may be an Internet-of-Things (IoT)-connected device such as a home appliance, or even another web server. The client device may include a display device on which the user may view digital content stored on the client device or downloaded from the managed node 100. In addition, the client device may include a user interface (UI), such as physical and/or on-screen buttons, with which the user may interact to perform functions such as consuming digital content, obtaining digital content, and transmitting digital content.

In one embodiment, the security manager 115 may transmit a signal or message to the managed node 100 to execute a malware remediation action. The malware remediation action may include terminating a write operation associated with a detected file operation request. The malware remediation action may include terminating the detected file operation request by deleting the detected file operation request from memory. The malware remediation action may include isolating a disk file image associated with the identified process. The disk file image is a file that stores all the content and the structure of an entire disk. The disk may be an optical disk, a hard disk drive, etc. The disk file image may be an exact copy of a disk volume or of an entire physical disk drive. The disk file image may retain all the properties of its source: files, folders, properties and the disk's name.

In one embodiment, the security manager 115 may transmit a signal or message to the managed node 100 to execute a steganography remediation action. The steganography remediation action may include terminating processing and transmission of a file that is trying to pass the firewall. The steganography remediation action may include isolating the file.

The firewall 135 is a network security system that monitors and controls incoming and outgoing network traffic based on security rules. The firewall 135 establishes a barrier between the trusted internal managed node 100 and the untrusted external network 110. The firewall 135 may be a network firewall or a host-based firewall. If the firewall 135 is a host-based firewall, it may be located within the managed node 100 or may run on the managed node 100 to control network traffic in and out of the managed node 100.

The malware analytics module 140 performs malware detection analytics on incoming files to the managed node 100 or on files associated with detected file operations. The malware analytics module 140 may be located within the managed node 100 or may run on the managed node 100. In one embodiment, the malware analytics module 140 may perform malware detection analytics on a file buffer associated with the detected file operation request to detect behavior indicating presence of malware. Similarly, the malware analytics functions can be distributed among other entities of the managed node 100.

In one embodiment, the malware analytics module 140 may perform analytics for real-time detection of and protection from steganography in a kernel mode. Once transmission of a file via a firewall, an operating system, or an e-mail system has been detected, the malware analytics module 140 may determine a size of the file. The size of the file is a measure of how much data the file contains or, alternately, how much storage it consumes. Typically, the size of the file is expressed in units of measurement based on the byte.

In one embodiment, the malware analytics module 140 may determine the size of the file by obtaining a pointer to a section header of the file. The section header is associated with a plurality of sections of the file. For each section i of the plurality of sections of the file, the malware analytics module 140 may determine a size $s_i$ of the section i. The malware analytics module 140 may sum up the size $s_i$ of each section i of the plurality of sections of the file to determine the size of the file as $\Sigma_i s_i$.

In one embodiment, the malware analytics module 140 may obtain the pointer to the section header of the file by opening the file using a filename of the file or a path of the file. The filename of the file is a name used to uniquely identify the file. The file system may impose a restriction on the filename length and the allowed characters within the filename. The filename may include one or more of the host name, device name, directory (or path), base name of the file, type (format or extension), and version of the file.

The malware analytics module 140 reads a header of the file. The header of the file may include metadata typically stored at the start of the file. The metadata may also be present in other areas, e.g., at the end of the file, depending on the file format or the type of data contained. The header of the file may be character-based (text), a binary header, etc. The header of the file may identify the file format as well as (for an image file) store information about image format, size, resolution and color space, etc.

The malware analytics module 140 may retrieve a magic number from the header. The magic number may be a numerical or text value used to identify the file format or protocol. For example, the magic number may be bytes within the file used to identify the format of the file. Typically, the magic number is a short sequence of bytes (e.g., 4 bytes long) placed at the beginning of the file. For example, for a portable executable (PE) file, the hex signature may be "4D 5A" and the magic number may be "MZ." The malware analytics module 140 may verify the magic number to obtain the pointer to the section header of the file.

The file system may store a filesize of the file. For example, the file system may store the number of bytes of the file that indicates how much storage is associated with the file. The stored filesize may be a non-negative whole number of bytes up to a system limit. In another example, the stored filesize may be the number of blocks or tracks occupied by the file on a physical storage device. In this example, software may be used to track the exact byte count. The malware analytics module 140 may retrieve, from a file system of the managed node 100, a stored filesize of the file. The maximum file size a file system supports depends not only on the capacity of the file system, but also on the number of bits reserved for the storage of filesize information. The maximum file size in the FAT32 file system, for example, is 4,294,967,295 bytes, which is one byte less than four gigabytes.

The malware analytics module 140 may compare the determined size of the file to the stored filesize of the file. Responsive to the determined size of the file being larger than the stored filesize of the file, the malware analytics module 140 may execute steganography detection analytics on the file. In one embodiment, the malware analytics module 140 may execute the steganography detection analytics by identifying an appended payload in the file. The appended payload is the body or data that perform the actual malicious purpose of the malware. The payload (if not identified and removed) may cause the managed node 100 to slow down or freeze, send spam, encrypt data, delete files on disk, crash the system, or corrupt files, etc. The malware analytics module 140 may analyze the appended payload to determine a file format of the appended payload. The file format of the appended payload is the structure of how information is stored (encoded) in the appended payload. For example, the appended payload may be JPEG or TIFF for image or raster data, AI (Adobe Illustrator) for vector data, or PDF for document exchange. The malware analytics module 140 may execute the steganography detection analytics based on the file format of the appended payload.

In one embodiment, the malware analytics module 140 may perform one or more of Monte Carlo approximation, entropy determination, serial coefficient analysis, arithmetic mean determination, Chi-Square determination, and standard deviation determination to determine whether data within the appended payload is encrypted. The performing of the Monte Carlo approximation is illustrated and described below with respect to FIG. 5.

In one embodiment, the malware analytics module 140 may perform entropy determination to determine whether data within the appended payload is encrypted. Entropy measures the amount of information content in the appended payload by taking the negative logarithm of the probability distribution of the values to calculate the entropy of the appended payload as:

$$H = -\sum_{i=0}^{255} P_i \log_2(P_i)$$

In the entropy determination above, H is the total entropy and $P_i$ is the value of the byte read from the appended payload. Encrypted and obfuscated files usually have a much higher entropy than plain text or structured data files. The entropy H may be compared to an entropy threshold. An entropy above the threshold indicates that the appended payload is likely to be encrypted or compressed, and so it could be affected by ransomware. The malware analytics module 140 may perform entropy calculations on sections (buffers) or the entire appended payload to detect hidden or encrypted copies of malware ("packed") hidden in the appended payload.

In one embodiment, the malware analytics module 140 may perform serial coefficient analysis to determine whether data within the appended payload is encrypted. Serial coefficient analysis describes the relationship between observations of the same variable over specific periods of time, in this case the changing value of each byte in the appended payload. Serial coefficient analysis determines whether the values of the bytes in the appended payload are correlated. If there is no correlation, it means the value of the later bytes in the appended payload cannot be predicted by the previous values. The lower the serial correlation value, the higher the probability of strong encryption. If a variable's serial correlation is measured to be zero, then it means there is no correlation, and each of the observations is independent of one another. Conversely, if a variable's serial correlation skews toward one, it means that the observations are serially correlated, and that future observations are affected by past values.

In one embodiment, the malware analytics module 140 may perform Chi-Square determination to determine whether data within the appended payload is encrypted. Chi-Square determination may be used to differentiate compressed files from encrypted files. Chi-Square determination is a simple statistical test commonly used to compare observed data with expected data. The Chi-Square test is intended to test how likely it is that an observed distribution is due to chance. It is also called a "goodness of fit" statistic because it measures how well the observed distribution of data fits with the expected distribution if the variables are independent. A payload that is compressed will have a high entropy and a high Chi-Square value. The expected values for a perfectly random payload of bytes would have a mean of 127.5 (255/2). This enables the determination of encrypted, compressed, and encrypted compressed files. The formula for calculating the Chi-Square value is:

$$x^2 = \sum_{i=1}^{n} \frac{(O_i - E_i)^2}{E_i}$$

In one embodiment, the malware analytics module 140 may perform one or more of arithmetic mean determination and standard deviation determination to determine whether data within the appended payload is encrypted. If the appended payload is encrypted, the arithmetic mean of data values of the appended payload should approximately equal 127.5 (255/2). The standard deviation σ is a measure used to quantify the amount of variation or dispersion of the data values. The arithmetic mean and standard deviation are computed for a portion of the appended payload as well as the entire appended payload. Because the malware analytics module 140 may directly read the operating system's internal I/O buffers, the read and write overhead is reduced. This enables a larger number of statistical determinations to be computed and analyzed, resulting in a more accurate, faster determination, using fewer system resources. The statistical determinations can provide partial and total values even if the data is provided out of order. Such out of order determination enables high-performance, multi-threaded, and multi-process embodiments.

In one embodiment, the malware analytics module 140 may execute the steganography detection analytics by identifying presence of unauthorized data within the appended payload. For example, the malware analytics module 140 may identify unauthorized rootkit installations or data encryption. The detection of unauthorized changes to data is described in detail below with respect to FIG. 4. In one embodiment, the malware analytics module 140 may identify instructions on disk that an unauthorized system has been gathering sensitive information (outbound embodiment). Unauthorized transmission of data may thus be prevented. In one embodiment, static analysis is used to protect against malware in analysis of a file without execution of a program. In an inbound embodiment, unauthorized code may be detected entering a corporate environment, e.g., a malicious sequence of code hidden in an mp3 downloaded from the Internet.

In one embodiment, the malware analytics module 140 may execute the steganography detection analytics by identifying presence of assembly level or machine level instructions within the appended payload. Assembly-level instructions refer to a low-level programming language, in which there is a strong (but often not one-to-one) correspondence between the language and the architecture's machine level instructions. The malware analytics module 140 identifies indications of suspicious instruction sets, e.g., machine or assembly level language. In an embodiment, the method partially disassembles files and looks for such suspicious instruction sets.

Responsive to the steganography detection analytics indicating presence of steganography in the file, the malware analytics module 140 may transmit a signal to the managed node 100 to execute a steganography remediation action. The malware analytics module 140 may transmit information describing the steganography to a client device.

The router 145 is a networking device that forwards data packets between the managed node 100 and the network 110. The router 145 may also perform traffic directing functions. When a data packet comes in from the network 110, the router 145 reads the network address information in the packet to determine the ultimate destination. The switch 150 is a computer networking device that connects devices together on the network by using packet switching to receive, process, and forward data to the destination device. In one embodiment, the switch 150 is a multiport network bridge that uses hardware addresses to process and forward data at the data link layer (layer 2) of the OSI model.

The network 110 enables communications among the client devices and the managed node 100. To this end, the network 110 receives requests and corresponding data (e.g., contents of a file to be posted on a web page) from client devices and forwards the requests to the managed node 100. Likewise, the network 110 receives responses from the managed node 100 and forwards the responses to the client devices.

The network 110 can comprise the Internet as well as mobile telephone networks. In one embodiment, the network 110 uses standard communications technologies and/or protocols. Thus, the network 110 can include links using technologies such as Ethernet, 802.11, Long-Term Evolution (LTE), etc. The networking protocols used on the network 110 can include multiprotocol label switching (MPLS), the transmission control protocol/Internet protocol (TCP/IP), the User Datagram Protocol (UDP), HTTP, the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
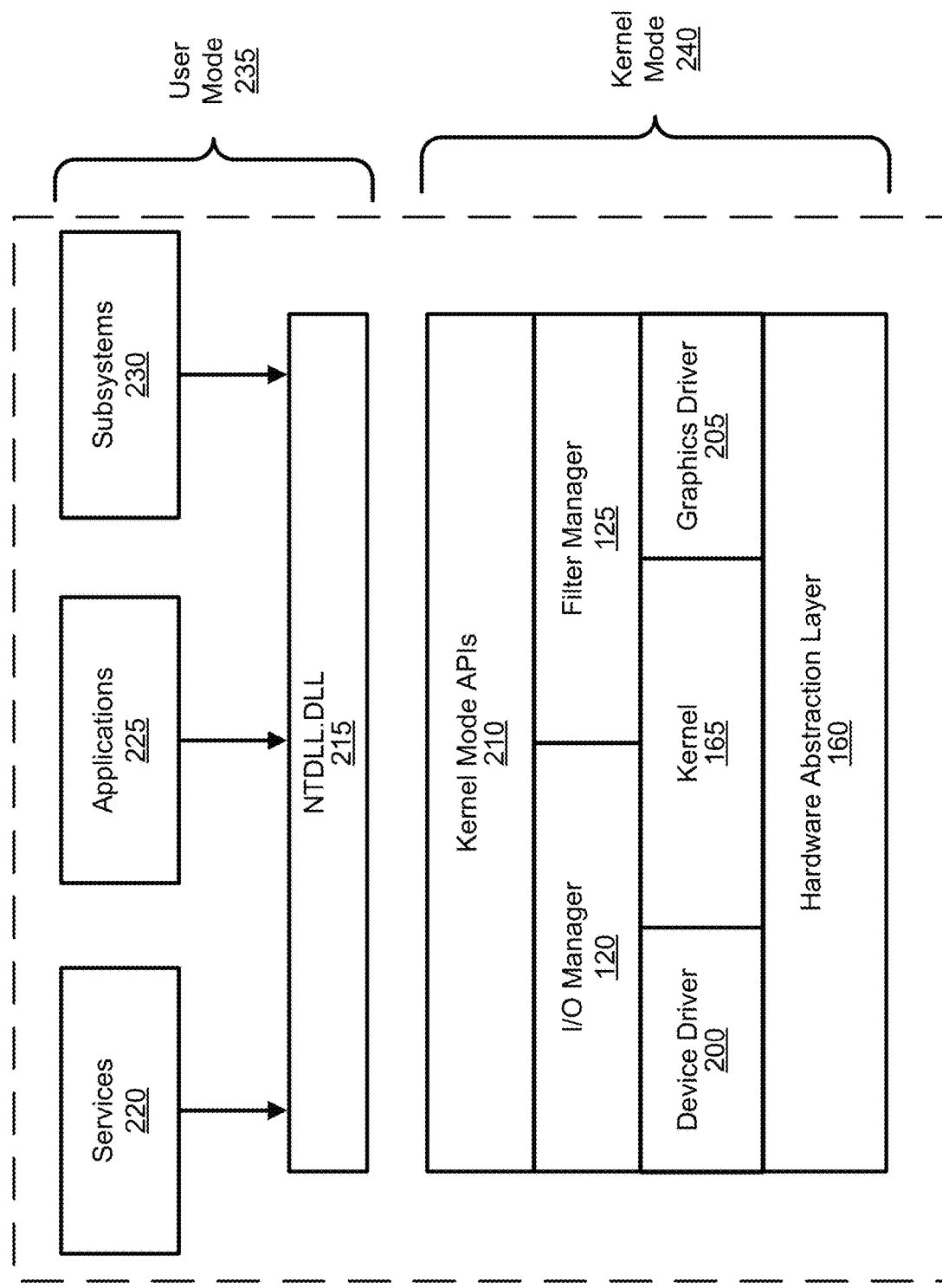
FIG. 2 illustrates an example block diagram of real-time detection of and protection from malware for applications running in user mode on a platform, in accordance with an embodiment.

Detection of Malware for Applications Running in User Mode and Kernel Mode on a Platform FIG. 2 illustrates an example block diagram of real-time detection of and protection from malware for applications 225 running in user mode 235 on a platform, in accordance with an embodiment. The platform illustrated is based on a processor, e.g., manufactured by Intel, AMD or ARM. The operating system on the platform includes user mode 235 and kernel mode 240.

In one embodiment, kernel mode 240 is reserved for the lowest-level, most trusted functions of the operating system. Code that runs in kernel mode 240 may share a single virtual address space. Therefore, a kernel mode driver (e.g., 200) is not isolated from other drivers (e.g., 205) and the operating system itself. In kernel mode 240, the executing code has access to the underlying hardware (e.g., processor 310 described below with reference to FIG. 3). It can execute CPU instructions and reference memory addresses.

The processor may switch between the two modes depending on the type of code running on the processor. For example, applications 225 may run in user mode while core operating system components may run in kernel mode 240. Drivers may run in kernel mode 240 or user mode 235. In other embodiments, the platform comprises additional or fewer components than those described herein. Similarly, the functions can be distributed among the components and/or different entities in a different manner than is described here.

The services 220 refer to programs that operate in the background (similar in concept to a daemon). The user mode 235 includes subsystems 230, which run applications 225 written for many different types of operating systems. The subsystems 230 in user mode 235 are limited to certain system resources, while the kernel mode 240 typically has unrestricted access to the system memory and external devices. The user mode 235 includes subsystems capable of passing I/O requests to the appropriate kernel mode device drivers 200 by using the I/O manager 120.

The operating system supports shared libraries known as dynamic-link libraries, which are code libraries that can be used by multiple processes while only one copy is loaded into memory. For example, NTDLL.DLL 215 exports the Windows Native API (the interface used by user mode components of the operating system that must run without support from Win32 or other API subsystems). NTDLL.DLL 215 is a file created by the operating system that has a description of "NT Layer DLL" and is the file that contains NT kernel functions. In one embodiment, NTDLL.DLL 215 may be located in the c:\windows\system32 or c:\winnt\system32 directory and can also be found in the c:\i386 directory.

The kernel mode APIs 210 interface with the I/O manager 120 and filter manager 125 (described above with respect to FIG. 1). The kernel mode device drivers 200 are programs that operate or control particular types of devices attached to the managed node 100. The kernel is described above with respect to FIG. 1. The graphics drivers 205 refer to software used by the operating system in kernel mode 240 to communicate with specific graphics devices. The hardware abstraction layer is described above with respect to FIG. 1.

In one embodiment, an application 225 may include one or more threads of execution. When running in Ring 3 (user mode 235) the application 225 (thread) may request a system service such as WriteFile( ). NTDLL.DLL 215 may call the SysEnter x86 instruction and the thread's context changes from user mode 235 to kernel mode 240. A context switch may occur when the kernel scheduler switches a processor (or core) from one thread to another. In this case, the thread is only being changed from Ring 3 to Ring 0. It remains on the same processor or core. A higher priority thread could be assigned to the previous thread's processor (a context switch). In one embodiment, a context switch may occur when 2 threads change state. On other architectures, an interrupt may be raised. Each thread has two stacks: one that is used for user mode 235 and another for kernel mode 240. An interrupt is raised and the thread kernel then executes the kernel mode Native API 210, such as NtWriteFile( ) or ZwWriteFile( ).

In one embodiment, when an application 225 runs in user mode 235, the operating system may create a process for the application 225. The process provides the application 225 with a private virtual address space and a private handle table. Because the application's virtual address space is private, one application cannot alter data that belongs to another application. Each application 225 runs in isolation, and if a user mode application crashes, the crash is limited to that one application. Other applications and the operating system are not affected by the crash. In one embodiment, each thread in kernel mode 240 shares a single virtual address space. Therefore, the state of all kernel mode threads and user mode threads are visible.

In one embodiment, the processor may provide multiple levels of security. In the case of 32-bit and 64-bit Intel and AMD processors, the kernel 165 may run in Ring 0, which is the most privileged. All user applications 225 are executed in Ring 3, which requests kernel services via system Dynamic Link Libraries (DLLs). All user mode 235 requests use NTDLL.DLL 215 to modify specific function parameters and switch the requesting thread from Ring 3 to Ring 0 using SysEnter. The dispatcher receives the request and passes it to the Executive's service. The scheduler reexamines the threads that are ready to run. A lower priority thread could be pre-empted during a user to privileged mode request which causes a context switch.

Example Filter Manager and Minifilter Drivers

Figure 3:
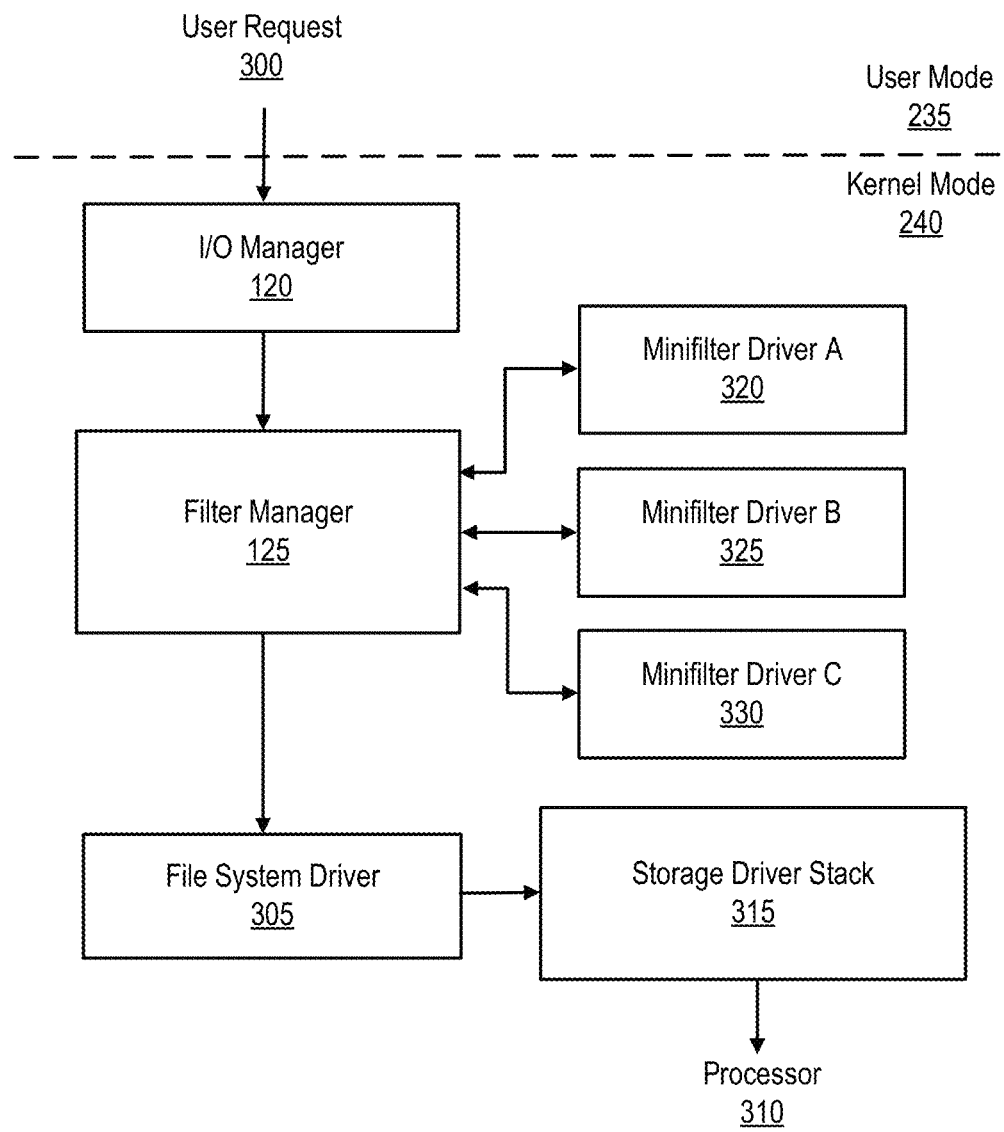
FIG. 3 illustrates an example filter manager and minifilter drivers for real-time detection of and protection from malware, in accordance with an embodiment.

FIG. 3 illustrates an example filter manager 125 and minifilter drivers 320, 325, and 330 for real-time detection of and protection from malware, in accordance with an embodiment. In other embodiments, the configuration comprises additional or fewer components than those described herein. Similarly, the functions can be distributed among the components and/or different entities in a different manner than is described here.

An application 225 or process running in user mode 235 on the processor 310 may generate a user request 300 (e.g., a file operation request such as a file open request). In one embodiment, the process 225 in user mode 235 makes a call to create a file in the Windows API. This call triggers the user request 300 for file I/O (e.g., a Windows NT API call). The request 300 goes through NTDLL.DLL 215. The I/O manager 120 detects the file operation request 300 initiated by the process 225 running in user mode 235. In one embodiment, the I/O manager 120 may be part of the Windows operating system. The I/O manager 120 locates where the target file is located (e.g., D:\ drive) and transmits a message to the filter manager 125 to determine whether a driver is interested in intercepting the file open request 300. The filter manager 125 is attached to a specific file system and specific volume.

from a file handle corresponding to the file operation request 300, whether the file operation request 300 corresponds to an operation of interest, e.g., a file open request. The filter manager 125 is a kernel mode driver that exposes functionality commonly required in file system filter drivers. Minifilter drivers (e.g., minifilter driver A 320) may be written to use this functionality, thus shortening the development process while producing higher-quality, more robust drivers. The file handle (also sometimes termed file descriptor) is an abstract indicator (e.g., number) used to access a file or other input/output resource, such as a pipe or network socket. When the file is opened, the type of file access requested is determined, e.g., read, write, shared, and exclusive. Minifilter driver A 320 or C 330 perform the add handle step. The add handle step determines whether the file handle is of interest and stores it in a tree. It is of interest if it is writing a buffer with strong encryption. If the handle is not of interest, it can be ignored.

Responsive to determining that the file operation request 300 corresponds to an operation of interest, the file operation request 300 is intercepted. In one embodiment, the filter manager 125 intercepts the file operation request 300 by determining whether a minifilter driver (e.g., minifilter driver A 320) is registered to intercept file operation requests. The minifilter driver A 320 may have previously registered with the filter manager 125 for events of interest (e.g., fopen, read, write, close, rename). Responsive to determining that the minifilter driver A 320 is registered to intercept file operation requests, the filter manager 125 transmits the file operation request 300 to the minifilter driver A 320.

In one example, the filter manager 125 checks if a minifilter driver (e.g., minifilter driver A 320) is interested in intercepting the request 300. The filter manager 125 may identify minifilter driver A 320 by a callback. First, the minifilter driver A 320 registers and then it identifies which events it is interested in. The operations may be implemented as follows.

```
DRIVER_INITIALIZE DriverEntry;
NTSTATUS
DriverEntry (
    _In_ PDRIVER_OBJECT DriverObject,
    _In_ PUNICODE_STRING RegistryPath
    );
NTSTATUS
EnZooMessage (
    _In_ PVOID ConnectionCookie,
    _In_reads_bytes_opt_(InputBufferSize) PVOID InputBuffer,
    _In_ ULONG InputBufferSize,
    _Out_writes_bytes_to_opt_(OutputBufferSize,*ReturnOutputBufferLength) PVOID
OutputBuffer,
    _In_ ULONG OutputBufferSize,
    _Out_ PULONG ReturnOutputBufferLength
    );
NTSTATUS
EnZooConnect(
    _In_ PFLT_PORT ClientPort,
    _In_ PVOID ServerPortCookie,
    _In_reads_bytes_(SizeOfContext) PVOID ConnectionContext,
    _In_ ULONG SizeOfContext,
    _Flt_ConnectionCookie_Outptr_ PVOID *ConnectionCookie
    );
VOID
EnZooDisconnect(
    _In_opt_ PVOID ConnectionCookie
    );
```

In one embodiment, the filter manager 125 is initialized in the kernel mode 240. The filter manager 125 may determine, Malware detection analytics are performed on a file buffer associated with the detected file operation request 300 to detect behavior indicating presence of malware. A minifilter driver in the kernel mode 240 performs malware detection analytics on the file buffer to detect the unauthorized/suspicious behavior. The malware detection analytics may include Monte Carlo approximation, entropy, and/or serial coefficient analysis. The analytics include determining whether the data in the file buffer is encrypted. For example, a suspicious write operation may be detected. A minifilter driver may read the data directly from the operating system buffers to increase performance and reduce the overhead of statistical analysis. The malware analytics determine if the file is encrypted or not using the statistical techniques described with respect to FIG. 1 above. An "Analyze Kernel buffer" step may perform ransomware and malware analysis. Part of the steganography analysis may also be performed. Steganography may therefore be performed by multiple entities, e.g., static (scan), dynamic (real-time), firewall, smtp server, etc.

Responsive to detecting the behavior indicating the presence of the malware, the process 225 responsible for initiating the detected file operation request 300 is identified. Minifilter driver A 320 performs malware analytics for write operations. Minifilter driver A 320 handles pre file access operations (file read/write requests). The filter manager 125 transmits a call to minifilter driver A 320, which determines a combination of Chi-Square, entropy, serial coefficient correlation, and Monte Carlo Pi approximation to decide if it should move forward with the file open operation 300 or not. Minifilter driver A 320 can analyze writes because it already has the write data in the operating system kernel I/O buffer. Minifilter driver A 320 analyzes the write buffer for malware state changes. Key malware detection analytics are performed and the data is written only when it is determined that the data is not encrypted. If the malware analytics indicate no strong encryption, the FileWrite( ) operation is allowed to succeed.

Minifilter driver C 330 performs malware analytics for reads. Minifilter driver C 330 also handles post file access operations. It analyzes the read buffer for malware state changes. Before the request 300 reaches minifilter driver C 330, there is no state change (write) to system yet. If minifilter driver A 320 or C 330 detect a state change indicating malware, they can halt the file operation 300. If minifilter driver C 330 approves the "fread" operation, the filter manager 215 transmits a request to the file system driver 305, which sends the I/O request packet to the storage driver stack 315. The file system driver 305 may be a file system driver for removable media (e.g., CD-ROM), a file system driver based on the Windows inbox FastFAT file system used as a model for new file systems, a transaction-aware file scanner that examines data in files, etc. The minifilter driver C 330 is called again, examines the buffer, and sends approval to the filter manager 125.

Once data is read using the processor 310, an IRP is passed back to the Filter manager. The Minifilter C looks at the data in the IRP. For example, if the driver analyzes the write buffer, before the write operation, it calculates the entropy, Chi-Square, Monte Carlo Pi approximation, serial correlation coefficient, mean, standard deviation and other statistics to detect unauthorized data encryption, data deletion or suspicious behavior. Minifilter A protects from malware writing encrypted data to a file on disk 155 based on these statistics. Minifilter C identifies data that was previously encrypted and helps build a whitelist and blacklist from the process reading the data. Minifilter A protects from data being encrypted but Minifilter C cannot decrypt the encrypted data so it identifies the process that is using the file. Minifilter A might best be described as pre-write operation detection and Minifilter C as post read operation detection. The system registers for pre and post operations to update and maintain its data structures.

Minifilter driver B 325 is a 3rd party driver. Using minifilter driver B 325, the disclosed embodiments may also detect malware that tries to delete files, rename files, or change directories.

A search for the identified process 225 is performed on one or more of a blacklist of programs and a whitelist of programs to determine whether the identified process 225 is a trusted process. The blacklist of programs may include known malicious or suspicious programs that should not be allowed access or running (execution) rights. These programs typically include malicious software such as viruses, Trojans, worms, spyware, keyloggers, and other forms of malware. Blacklisted programs might also include users, business applications, processes, IP addresses, and organizations known to pose a threat to an enterprise or individual.

The whitelist of programs may include a list of acceptable entities (software applications, email addresses, users, processes, devices, etc.) that are allowed access to the managed node 100. The whitelist may identify applications 225 based on their file name, size, and directory paths. In one embodiment, the whitelist may use a combination of cryptographic hash techniques and digital signatures linked to the manufacturer or developer of each component or piece of software 225.

In one example, the managed node 100 may determine that the identified process 225 is not a trusted process by locating the identified process 225 on the blacklist of programs. The managed node 100 transmits information describing the malware to a client device. In one example, the managed node 100 may determine that the identified process 225 is a trusted process by locating the identified process 225 on the whitelist of programs. The minifilter driver then ignores the detected file operation request.

Because the minifilter driver A 320 and minifilter driver B 330 execute in kernel mode 240, they can determine which process is changing the state of the file. If the file is being encrypted or large amounts of data are being deleted, the managed node 100 may ask the user if they want to allow the process 225 to change the file system's state. If the user approves the operation, it is allowed, and an SHA256 Hash of the processed image is optionally stored on the whitelist. If the process is malware, then the SHA256 Hash is added to the blacklist. When a process is executed, the driver checks the blacklist and prevents execution if blacklisted In one embodiment, the managed node 100 may determine whether the identified process 225 is a trusted process as follows. Responsive to not locating the process 225 on the blacklist of programs or the whitelist of programs, the managed node 100 may transmit a request to the client device to authorize the identified process. The managed node 100 may generate data that causes a prompt to be presented to the client device to inquire whether the process 300 is authorized, e.g., the prompt may include a CAPTCHA.

Responsive to transmitting the request to the client device to authorize the identified process 225, the managed node 100 may receive a message from the client device that the identified process 225 is not authorized. The identified process 225 is then added to the blacklist of programs for malware detection. Responsive to receiving a message from the client device that the identified process 225 is authorized, the identified process 225 may be added to the whitelist of programs.

Responsive to determining that the identified process 225 is not a trusted process, a malware remediation action is executed against the identified process 225. The attack details are logged locally. For example, the minifilter driver A 320 may transmit a message to the filter manager 215 to stop, pause, or permit the file operation request 300. In one embodiment, a similar technique is used to inspect inbound files in line with the firewall 135. Malware analytics are used to prevent malware from getting past the firewall 135 to the network's router 145 and switch 150. The inline embodiment may also detect steganography. Any suspicious files are logged and isolated so the user can restore the file if it was a false positive.

Example Components of a Volume Shadow Service

Figure 4:
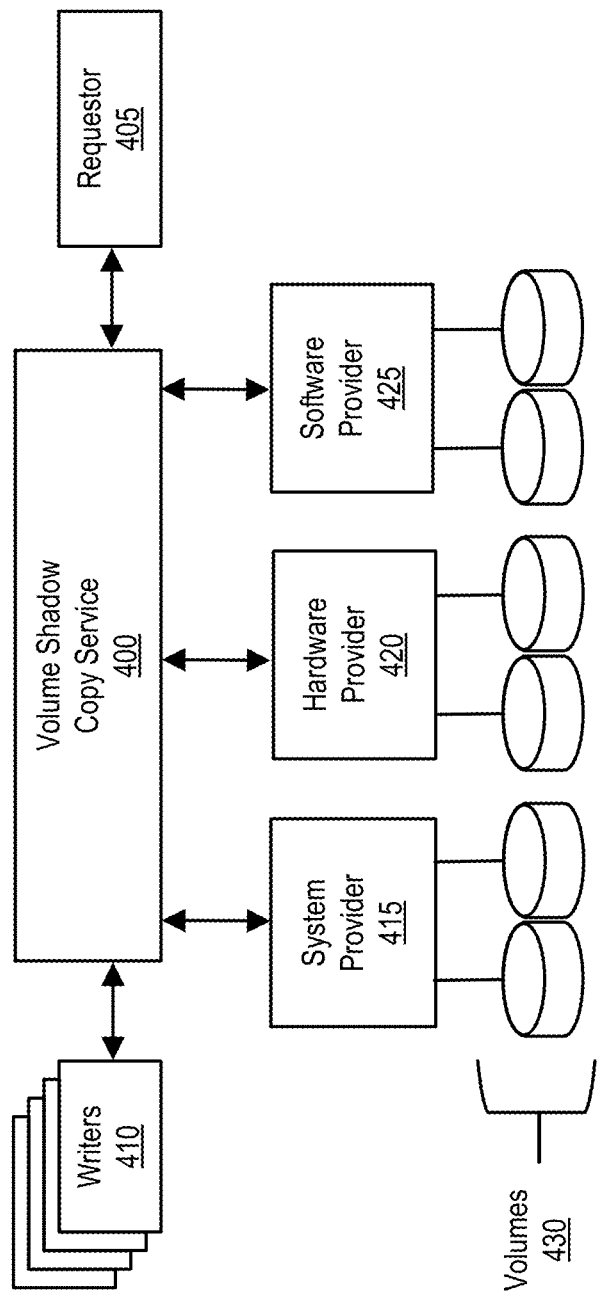
FIG. 4 illustrates example components of a volume shadow service (VSS) for real-time detection of and protection from malware, in accordance with an embodiment.

FIG. 4 illustrates example components of a volume shadow service (VSS) for real-time detection of and protection from malware, in accordance with an embodiment. The VSS includes a VSS Copy Service 400, a VSS Requestor 405, VSS Writers 410, and VSS Providers 415, 420, and 425. In other embodiments, the VSS comprises additional or fewer components than those described herein. Similarly, the functions can be distributed among the components and/or different entities in a different manner than is described here.

Ransomware may attempt to disable the VSS to prevent recovery of files that were infected or encrypted. The embodiments disclosed herein use specific data recovery APIs to ensure that useful backups can be restored to prevent data loss. The VSS reads and writes to the configuration database, which is encrypted to protect against unauthorized changes. The VSS analyzes the device and automatically creates the optimal resource configuration for that device based on the core and processor type and current workload. Processor information and memory information is used to configure the size of the thread pool.

Events, such as malware detection and removal, are written to a local log. The local log is regularly replicated from the managed node 100 and firewall 135 to a central log server designated by security manager policy.

Example Data Points for Monte Carlo Pi Approximation

Figure 5:
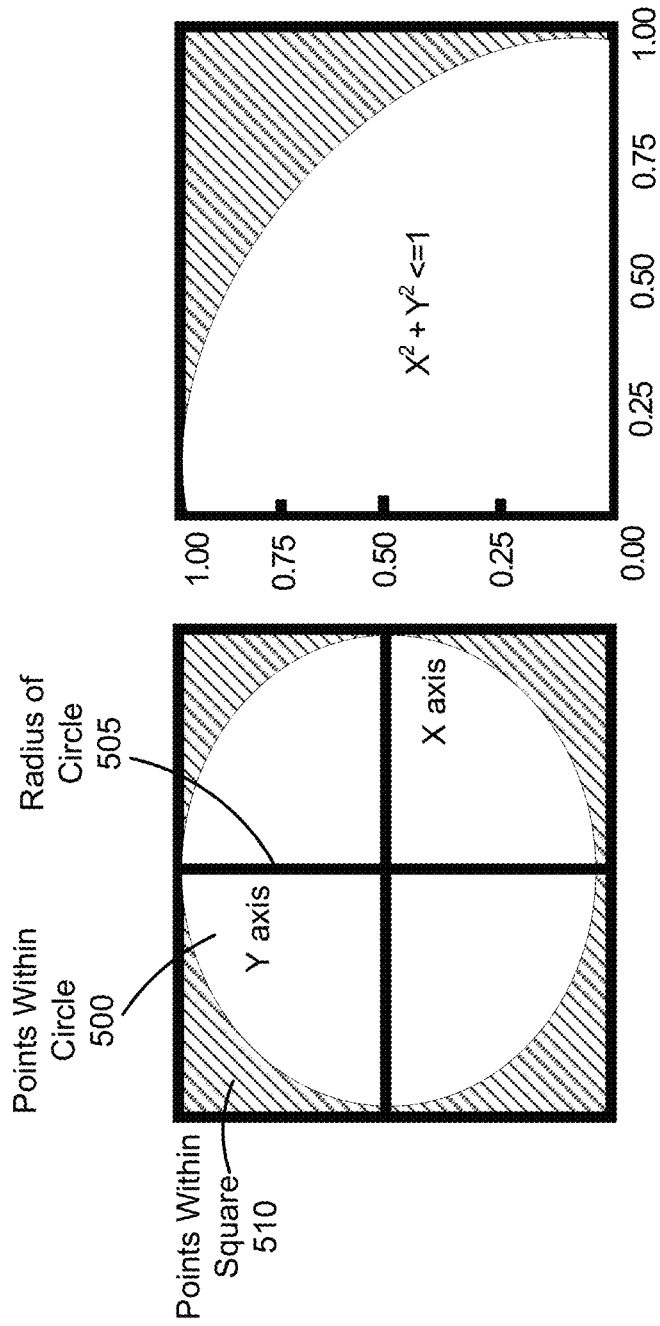
FIG. 5 illustrates example data points for Monte Carlo Pi approximation, in accordance with an embodiment.

FIG. 5 illustrates example data points for Monte Carlo Pi approximation, in accordance with an embodiment. Monte Carlo Pi approximation may be used to differentiate compressed files from encrypted files. Monte Carlo simulations allow the measurement of randomness of the values in a file. One application of Monte Carlo simulations is to approximate the value of Pi ($\pi$) based on the data in a file. The more random the values contained in the file, the more accurate the estimated value of $\pi$. The value of Pi ($\pi$) is calculated by the ratio of the data points 500 inside an inscribed unit circle to the total number of data points 510 in a square.

FIG. 5 illustrates the data points 500 inside an inscribed unit circle and the total number of data points 510 in a square. The closer the approximation calculated is to the known value of Pi, the better it describes the randomness of the data values. A perfect encryption algorithm would have completely random values and provide an accurate approximation of Pi. In one embodiment, the system performs the following determinations.

$$\text{Area Circle} = \pi r^2$$

$$\text{Area Sq} = (2r)^2 = 4r^2$$

Assume the radius 505 is 1 unit and the points 500 in the circle are given by ($x^2+y^2<=1$). The area of the circle/the area of the square=(Pi×radius$^2$)/(4×radius$^2$)=Pi/4. Therefore, the number of points 500 inside the circle divided by the total number of points 510 are given by Pi/4.

Example Process for Real-Time Detection of and Protection from Malware

Figure 6:
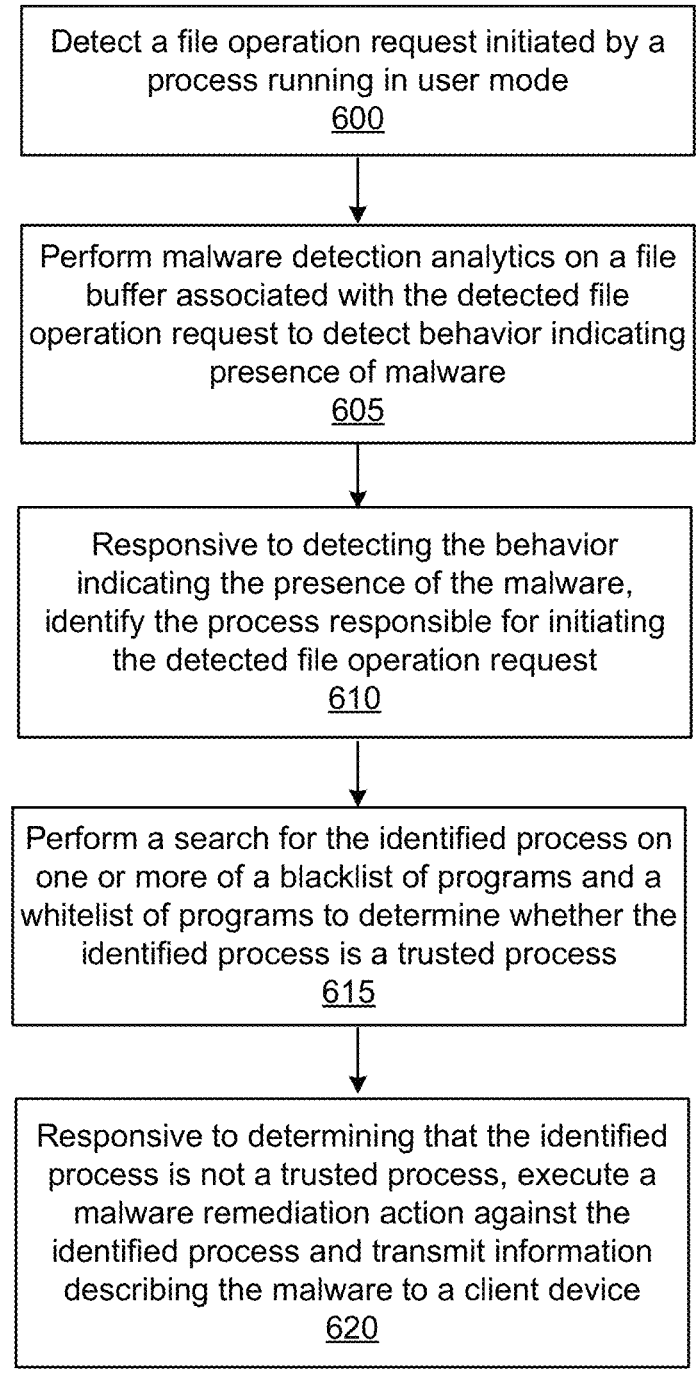
FIG. 6 illustrates an example process for real-time detection of and protection from malware, in accordance with an embodiment.

FIG. 6 illustrates an example process for real-time detection of and protection from malware, in accordance with an embodiment. In one embodiment, the process of FIG. 6 is performed by the managed node 100. Other entities (e.g., the malware analytics module 140) may perform some or all of the steps of the process in other embodiments. Likewise, embodiments may include different and/or additional steps, or perform the steps in different orders.

The managed node 100 detects 600 a file operation request 300 initiated by a process 225 running in user mode 235. The managed node 100 may detect the file operation request 300 by determining, from a file handle corresponding to the file operation request 300, whether the file operation request 300 corresponds to an operation of interest.

The managed node 100 performs 605 malware detection analytics on a file buffer associated with the detected file operation request 300 to detect behavior indicating presence of malware. The malware detection analytics may include a combination of Chi-Square, entropy determination, serial coefficient correlation, and Monte Carlo Pi approximation Responsive to detecting the behavior indicating the presence of the malware, the managed node 100 identifies 610 the process 225 responsible for initiating the detected file operation request 300.

The managed node 100 performs 615 a search for the identified process 225 on one or more of a blacklist of programs and a whitelist of programs to determine whether the identified process 225 is a trusted process. The blacklist of programs may include known malicious or suspicious programs that should not be allowed access or running (execution) rights. The whitelist of programs may include a list of acceptable entities (software applications, email addresses, users, processes, devices, etc.) that are allowed access to the managed node 100.

Responsive to determining that the identified process 225 is not a trusted process, the managed node 100 executes 620 a malware remediation action against the identified process 225 and transmits information describing the malware to a client device. The malware remediation action may include terminating a write operation associated with a detected file operation request. The malware remediation action may include terminating the detected file operation request by deleting the detected file operation request from memory. The malware remediation action may include isolating a disk file image associated with the identified process.

Figure 7:
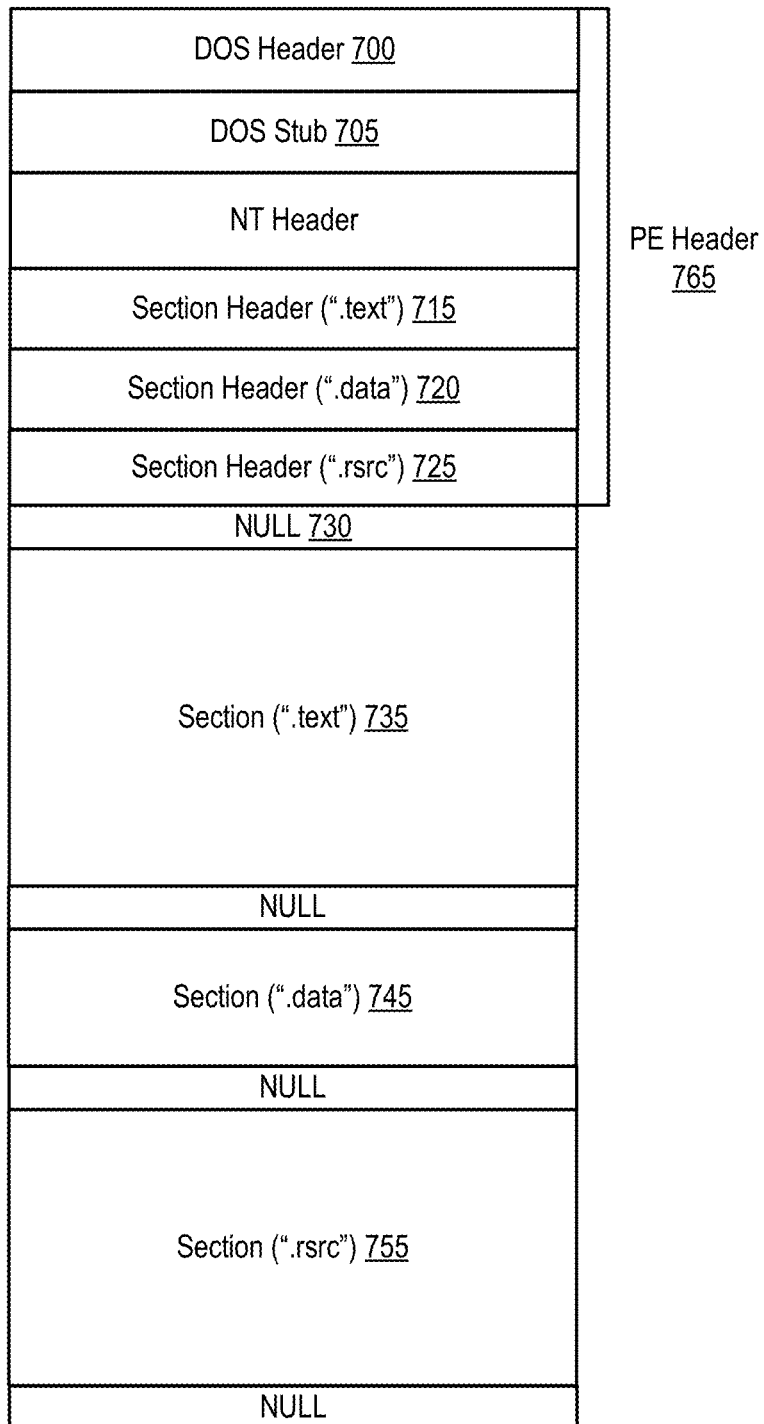
FIG. 7 illustrates components of an example portable executable (PE) file for real-time detection of and protection from steganography in a kernel mode, in accordance with an embodiment.

Portable Executable (Pe) File for Real-Time Detection of and Protection from Steganography FIG. 7 illustrates components of an example portable executable (PE) file for real-time detection of and protection from steganography in a Kernel mode, in accordance with an embodiment. The PE format is a file format for executables, object code, DLLs, FON Font files, and others used in 32-bit and 64-bit versions of Windows operating systems. The PE format is a data structure that encapsulates the information necessary for the Windows OS loader to manage the wrapped executable code.

The PE header 765 includes the DOS executable header 700, which contains relocation information, which allows multiple segments to be loaded at arbitrary memory addresses. The DOS stub 705 is a valid application that runs under MS-DOS. It is placed at the front of an ExE image. Each row of the section table (e.g., 715, 720, and 725) is a section header. The section headers may have a NULL 730 terminator. Each section (e.g., 735, 745, and 755) may also have a NULL terminator.

The embodiments disclosed herein relate to a method using the PE file format illustrated in FIG. 7 for real-time detection of and protection from steganography in a kernel mode. Steganography may be used to conceal malware inside a container. The container may be a picture, movie, audio file, or an executable. Steganography may be used to conceal information in a picture, mp3, or exe file. For example, a 128 Byte text message may be hidden in a 4 MB picture. An exe file may be hidden inside another exe file (packing). A malware file may be hidden in a pkzip file. Drive-by downloads of a virus may occur when a user is visiting a website. Malware may also be sent to a user. It may then go to each friend in the user's mailing list, and so on, e.g., in personalized Christmas cards. The malware may encrypt files over a period of several months and get rid of the encryption key. Traditional edge firewalls typically cannot detect files that contain hidden pictures, messages, or malware concealed using steganography because file attachments are allowed to go through the firewall.

Transmission of a file via a firewall, an operating system, or an e-mail system is detected. In one embodiment, the PE is parsed. While reading and parsing the PE, the structure of the Windows EXE, DLL, Font, system drivers, and object code are analyzed for suspicious API usage. An example is the allocation of memory sections that have read, write and execute permissions that might allow the malicious program to be copied into the memory section and executed. In one embodiment, a Windows API is used to open the file using the fully-qualified file name (FQFN) of the process provided by calling GetModuleFileNameEx( ) and CreateFile( ). A handle to the image on disk is returned to the caller.

In one embodiment, the size of the PE file is determined and compared to the filesize of the file as stored. This embodiment may be used to detect if an image contains unauthorized data such as a malicious zip file or executable appended. In this embodiment, hidden information stored at the end of a PE file format (e.g., EXE, DLL, SCR, SYS, DRV, ACM, CPL, SCR, and so forth) may be identified. To determine the size of the PE file, the file is parsed and analyzed. The file is opened using a fully qualified filename of the file. A DOS header 700 of the file is read from a storage device 155. It is determined whether the DOS header 700 begins with "MZ" to determine whether the file is an executable file. A magic number is retrieved from the DOS header 700. The magic number is verified to obtain a pointer to a section header of the file. For each section of the file beginning at the section header, the name and attributes of the section are validated. The size of the section is determined. The name and the size of each section of the file is determined to determine a size of the file and identify non-standard section names often utilized by malware.

In one embodiment, the IMAGE_DOS_HEADER structure in the Winnt.h SDK header file is read from the storage device 155. The DOS header 700 is the first part of the file. This step determines if the DOS header 700 starts with MZ "xx xx xx." If the DOS header 700 starts with MZ, then it could be a DOS or a Windows program. If the DOS header 700 does not start with MZ, it is not an executable (e.g., it could be a JPG, GIF, etc.). This distinction determines which analytics to apply. The purpose of reading the DOS header 700 is to make sure the file is well formed. The process is looking for the creation of an illegitimate header. The DOS header 700 is static (unchanging) and includes a date and timestamp. The purpose of parsing the DOS header 700 is to detect the creation of an illegitimate header not in an existing list of known good headers. The illegitimate header (PE header) will have a pointer to a section with malware code (illegitimate instructions). The embodiments disclosed herein distinguish between executable and non-executable files because malware may be hidden as a compressed payload in an executable. The determination of the type of file is used to decide the particular analytics used to detect steganography in the file.

The number "MZ" (first few bytes of the file) is the magic number. A pointer obtained by verifying the magic number leads to a portion in the file where information is located. If the file is not a valid PE file, e.g., JPEG or GIF, it may be malware. In one embodiment, the magic number is retrieved from the e_magic member in the IMAGE_DOS_HEADER. To verify the magic number, the value "xx xx xx" in the DOS header 700 is used. The value found is compared to the Microsoft DOS IMAGE_DOS_SIGNATURE, which has the value 0x5A4D ("MZ"). If the value does not match the DOS signature, the file is not a DOS or Windows executable. Additional instructions may be executed to determine what format the file might be such as DOC, DOCX, PPT, PPTX, XLS, XLSX, MP3, GIF, JPG, PNG and so forth. Once the magic number is verified, a pointer to a section header is obtained. Since the DOS magic number is verified, the e_lfanew member may be used to create a pointer to the Windows PE header. The IMAGE_NT_HEADERS32 pointer is calculated by adding the size of the memory buffer to the e_lfanew value. The pointer to the PE header should read "01 00h." This location contains a PE signature which should be the number "50 45 00h." If this location doesn't read "50 45 00," then the file may be a suspicious file.

In one embodiment, the pointer may be dereferenced and compared to the IMAGE_NT_SIGNATURE (0x00004550). If the value of the dereferenced pointer does not match the IMAGE_NT_SIGNATURE signature, the file is not a Windows executable. Additional instructions may be executed to determine what format the file might be such as DOC, DOCX, PPT, PPTX, XLS, XLSX, MP3, GIF, JPG, PNG and so forth.

In one embodiment, the location of IMAGE SECTION HEADER is determined using the size of the IMAGE_NT_HEADERS32. The IMAGE_NT_HEADER member FileHeader is dereferenced to access the IMAGE FILE HEADER that contains the number of sections in the PE image. The counter variable is initialized to zero so that each section can be analyzed. The process determines if the number of sections is expected. Additional sections are suspicious and might contain malware. For each section, the section's name and attributes are validated. The size of the file is determined as the SizeOfRawData member of the section and the size of the pointer. This process may be repeated for each section. The last section's size is the number of bytes in the SizeOfRawData member. This result is the number of bytes the PE image should occupy on the storage device. Section by section analysis is used to compute the entire size of file.

From a file system, a stored filesize of the file is retrieved. In one embodiment, the operating system retrieves, from the file system, the file size stored on disk using the GetFileSize( ) API.

The determined size of the file is compared to the stored filesize of the file. In one embodiment, if the determined size of the file is greater than the stored filesize, data may be appended to the end of the PE file. If the return code indicates that there is no appended data, the PE size and stored filesize are equal (there is no data appended to the PE file). When the determined file size is larger than the stored filesize, this indicates the presence of additional data.

Responsive to the determined size of the file being larger than the stored filesize of the file, steganography detection analytics are executed on the file. In one embodiment, the appended data is analyzed to determine its file format and if it is encrypted. The return code indicates that data has been appended so a defined policy may be executed, such as isolate, delete or strip off the appended data. The steganography detection analytics involve performing statistical functions (entropy, Chi-Square, etc.) on the file. The analytics performed depend on the file type. If a GIF file, hidden data concealed in a ZIP file is searched for. If an EXE file, a different analysis may be performed. The information past the end of the exe file is used to perform entropy calculations, Chi-Square calculations, median, and standard deviation calculations to detect encryption.

In one embodiment, a static analysis algorithm is used to detect steganography. The benefits and advantages of this approach are that steganography detection may be performed without using signature scanning. The existence of hidden info is detected on either inbound or outbound data. The comparison between the determined size of file and the stored filesize is used to determine whether to perform more expensive analytics. The file size comparison determines whether there is an appended payload. Expensive analytics are not performed when the file size computation indicates the file size is normal. Therefore, by detecting steganography on the device and in-line with the firewall, dangerous files can be detected, isolated and removed before they can release their secret payload. In other embodiments, the steganography detection may be integrated with the firewall 135 or with e-mail.

Responsive to the steganography detection analytics indicating presence of steganography in the file, a steganography remediation action is executed. Information describing the steganography is transmitted to a client device.

Further benefits and advantages of the embodiments are that the method integrates steganography and ransomware detection in the firewall to check each packet. Integration of the method with the e-mail system scans the contents of each email and attachment. The invention does not look for signatures but for an indication of suspicious instruction sets, e.g., machine or assembly level language. In an embodiment, the method partially disassemble files and looks for such suspicious instruction sets.

Figure 8:
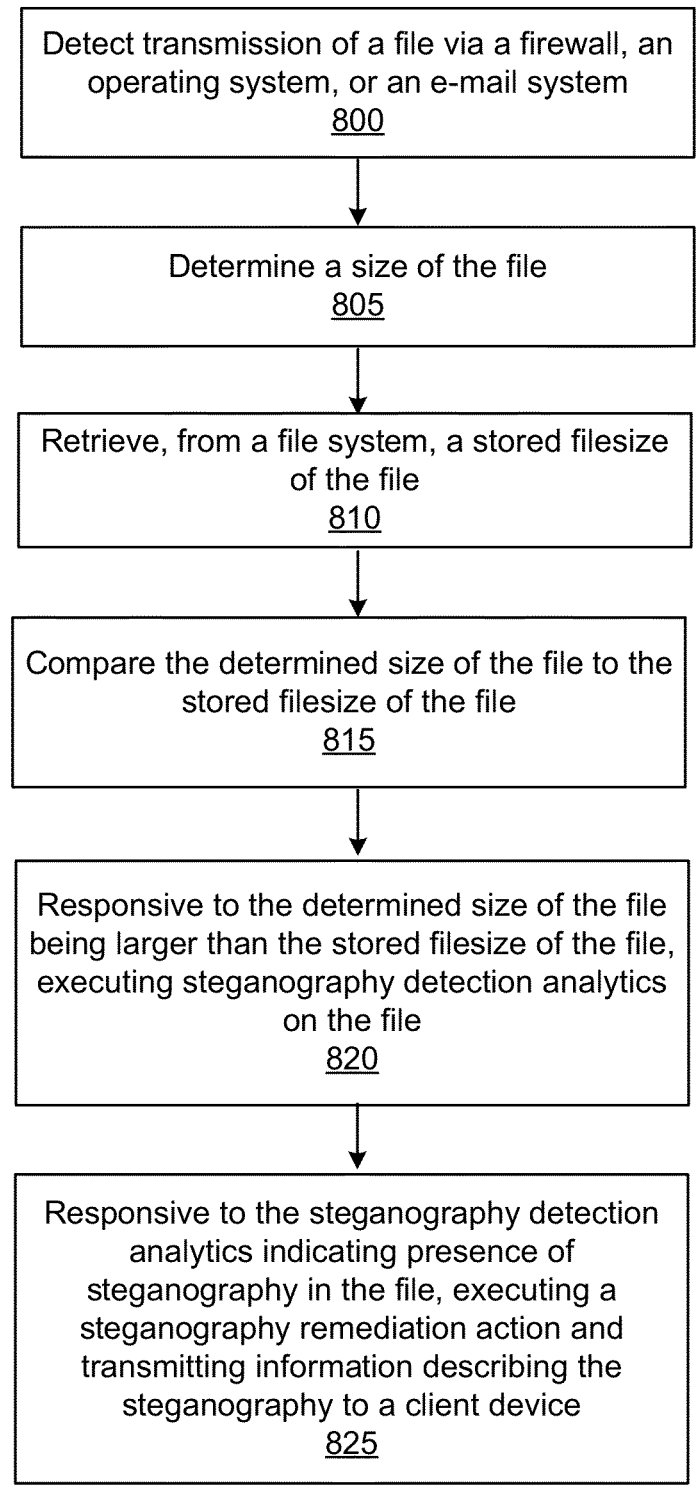
FIG. 8 illustrates an example process for real-time detection of and protection from steganography in a kernel mode, in accordance with an embodiment.

Process for Real-Time Detection of and Protection from Steganography in a Kernel Mode FIG. 8 illustrates an example process for real-time detection of and protection from steganography in a kernel mode, in accordance with an embodiment. In one embodiment, the process of FIG. 8 is performed by the managed node 100. Other entities (e.g., the malware analytics module 140) may perform some or all of the steps of the process in other embodiments. Likewise, embodiments may include different and/or additional steps, or perform the steps in different orders.

The managed node 100 detects 800 transmission of a file via a firewall, an operating system, or an e-mail system. In one embodiment, the PE is parsed. While reading and parsing the PE, the structure of the Windows EXE, DLL, Font, system drivers, and object code are analyzed for suspicious API usage.

The managed node 100 determines 805 a size of the file. The file size determination may be used to detect if an image contains unauthorized data such as a malicious zip file or executable appended. For example, hidden information stored at the end of a PE file format (e.g., EXE, DLL, SCR, SYS, DRV, ACM, CPL, SCR, and so forth) may be identified.

The managed node 100 retrieves 810, from a file system, a stored filesize of the file. In one embodiment, the operating system retrieves, from the file system, the file size stored on disk using the GetFileSize( ) API.

The managed node 100 compares 815 the determined size of the file to the stored filesize of the file. In one embodiment, if the determined size of the file is greater than the stored filesize, data may be appended to the end of the PE file. If the return code indicates that there is no appended data, the PE size and stored filesize are equal (there is no data appended to the PE file). When the determined file size is larger than the stored filesize, this indicates the presence of additional data.

Responsive to the determined size of the file being larger than the stored filesize of the file, the managed node 100 executes 820 steganography detection analytics on the file. The steganography detection analytics involve performing statistical functions (entropy, Chi-Square, etc.) on the file. The analytics performed depend on the file type. If a GIF file, hidden data concealed in a ZIP file is searched for. If an EXE file, a different analysis may be performed. The information past the end of the exe file is used to perform entropy calculations, Chi-Square calculations, median, and standard deviation calculations to detect encryption.

Responsive to the steganography detection analytics indicating presence of steganography in the file, the managed node 100 executes 825 a steganography remediation action and transmits information describing the steganography to a client device. The steganography remediation action may include terminating processing and transmission of a file that is trying to pass the firewall. The steganography remediation action may include isolating the file.

Alternative Embodiments

In alternative embodiments, the methods and system disclosed herein may be used to enhance protection and privacy for sensitive data either stored locally on the managed node 100 or in the cloud (e.g., cloud host 105). Using these alternative embodiments, unauthorized export of sensitive data across pre-set geographical boundaries may be detected and/or prevented. For example, the embodiments may be used to tag sensitive data to a particular geographic region and lock the data to that location, such that unauthorized export and/or access of the data from that geographical region is monitored and prevented. The alternative embodiments may therefore provide greater control to users over the export of personal data, personally identifiable information of data subjects. The alternative embodiments also provide enterprises with a method for prevention of data processing unless it is done under a lawful basis specified by regulations, and efficient reporting of data breaches.

In addition, the alternative embodiments enable enterprises to provide pseudonymisation and/or complete data anonymisation when data is stored. In one embodiment, stored personal data may be encrypted, such that the resulting personal encrypted data cannot be attributed to a specific data subject without a correct decryption key. In one embodiment, tokenization may be implemented, which replaces sensitive data with non-sensitive substitutes (tokens), which have no extrinsic or exploitable meaning or value. Tokenisation does not alter the type or length of data, which means it can be processed by legacy systems such as databases that may be sensitive to data length and type. The advantages and benefits of this approach are that fewer computational resources and less storage space is required than traditionally-encrypted data. Malware or steganography attacks on the protected data may then be detected and prevented using the disclosed embodiments, including performing malware or steganography detection analytics on files associated with a detected file operation request.

Example Machine

Figure 9:
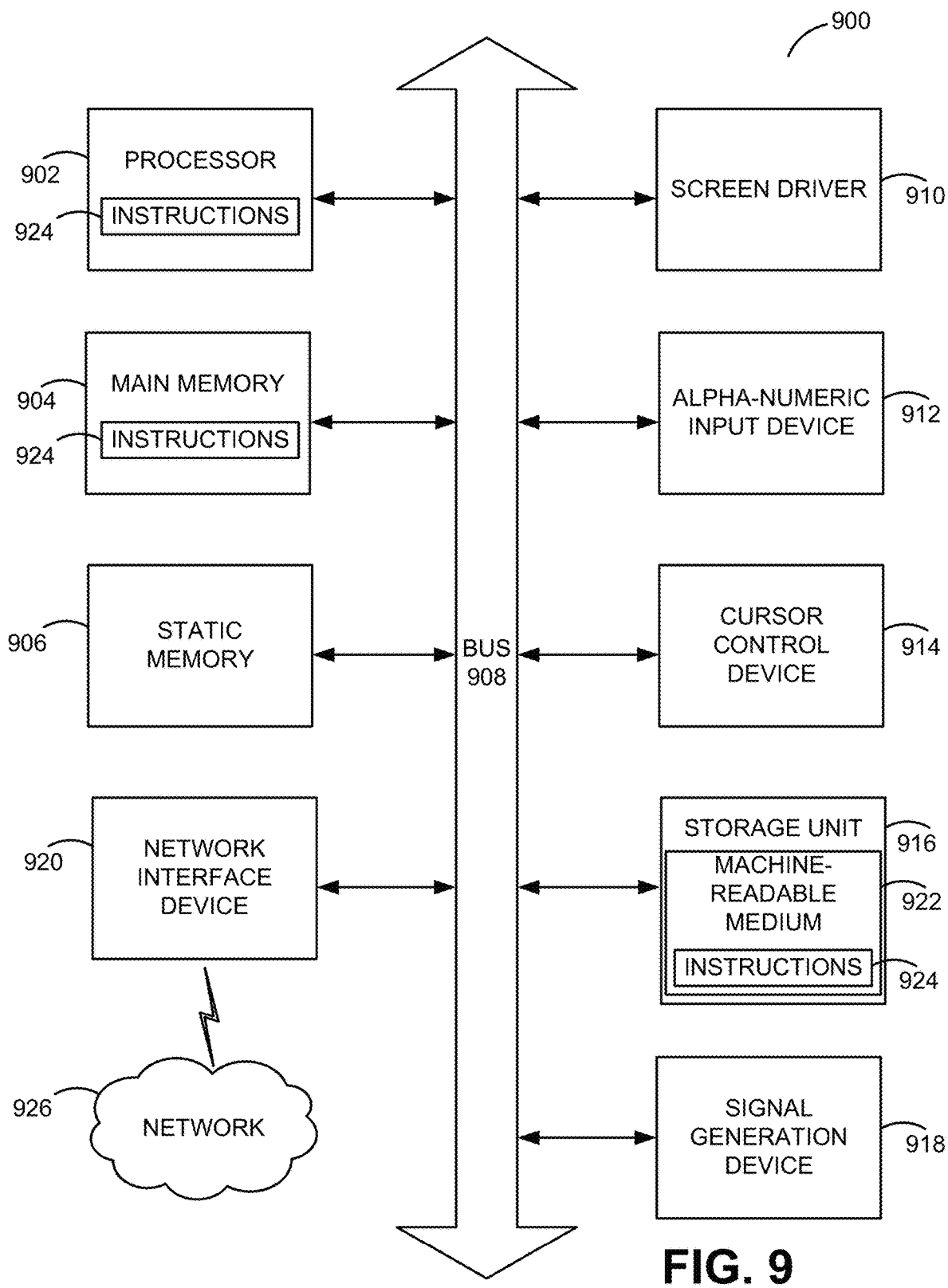
FIG. 9 is a block diagram illustrating components of an example machine able to read instructions from a machine-readable medium and execute them in a processor or controller.

FIG. 9 is a block diagram illustrating components of an example machine able to read instructions from a machine-readable medium and execute them in a processor or controller. Specifically, FIG. 9 shows a diagrammatic representation of a machine in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

In one embodiment, a non-transitory computer readable medium stores instructions, which when executed by at least one processor cause the processor to perform the operations described herein. The machine may be a server computer, a client computer, a personal computer (PC), a tablet PC, a set-top box (STB), a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904 and the storage unit 916 communicate via a bus 908.

In addition, the computer system 900 can include a static memory 906, a display driver 910 (e.g., to drive a plasma display panel (PDP), a liquid crystal display (LCD), or a projector). The computer system 900 may also include alphanumeric input device 912 (e.g., a keyboard), a cursor control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1-4, 6-7, and 9. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured, e.g., as a special-purpose processor, such as a field programmable gate array (FPGA) or an application-specific integrated circuit (ASIC), to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system and a process for detecting malware through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A method for real-time detection of and protection from steganography in a kernel mode, comprising:
   detecting a transmission of a file over a network via a firewall, an operating system, or an e-mail system;
   in response to detecting the transmission of the file:
      storing the transmitted file in a file system residing on physical storage media;
      determining a size of the transmitted file, by retrieving size data from a plurality of sections within the transmitted file;
      retrieving, from the file system from a source other than the file, a stored filesize value of the transmitted file by accessing a filesize value of the transmitted file from the file system, wherein the file is in a portable executable file format comprising an operating system executable header containing relocation information, wherein the operating system executable header allows multiple segments of the file to be loaded at arbitrary memory addresses; and
      comparing the determined size of the transmitted file to the stored filesize value of the transmitted file;
   determining, based on the comparison, that the determined size of the transmitted file is greater than the stored filesize value of the transmitted file;
   executing, responsive to determining that the determined size of the transmitted file is greater than the stored filesize value of the transmitted file, steganography detection analytics on the transmitted file; and responsive to the steganography detection analytics indicating presence of steganography in the transmitted file:
executing a steganography remediation action, and
transmitting information describing the steganography to a client device.

2. The method of claim 1, wherein the determining of the size of the transmitted file comprises:
obtaining a pointer to a section header of the file, the section header associated with a plurality of sections of the transmitted file;
for each section of the plurality of sections of the transmitted file, determining a size of the section; and
summing the size of each section of the plurality of sections of the transmitted file to determine the size of the transmitted file.

3. The method of claim 2, wherein the obtaining of the pointer to the section header of the transmitted file comprises:
opening the transmitted file using a filename of the file or a path of the transmitted file;
reading a header of the transmitted file;
retrieving a magic number from the header; and
verifying the magic number to obtain a pointer to the section header of the transmitted file.

4. The method of claim 1, wherein the executing of the steganography detection analytics on the transmitted file comprises:
identifying an appended payload in the transmitted file;
analyzing the appended payload to determine a file format of the appended payload; and
executing the steganography detection analytics based on the file format of the appended payload.

5. The method of claim 1, wherein the executing of the steganography detection analytics on the transmitted file comprises:
identifying an appended payload in the transmitted file; and
performing one or more of Monte Carlo approximation, entropy determination, serial coefficient analysis, arithmetic mean determination, Chi-Square determination, and standard deviation determination to determine whether data within the appended payload is encrypted.

6. The method of claim 1, wherein the executing of the steganography detection analytics on the transmitted file comprises:
identifying an appended payload in the transmitted file; and
identifying presence of unauthorized data within the appended payload.

7. The method of claim 1, wherein the executing of the steganography detection analytics on the transmitted file comprises:
identifying an appended payload in the transmitted file; and
identifying presence of assembly level or machine level instructions within the appended payload.

8. The method of claim 1, wherein the executing of the steganography remediation action comprises:
terminating processing and transmission of the transmitted file; and
isolating the transmitted file.

9. A non-transitory computer readable medium storing instructions that when executed by at least one processor cause the at least one processor to:
detect a transmission of a file via a firewall, an operating system, or an e-mail system;
in response to detecting the transmission of the file:
store the transmitted file in a file system residing on physical storage media;
determine a size of the transmitted file, by retrieving size data from a plurality of sections within the transmitted file;
retrieve, from the file system from a source other than the transmitted file, a stored filesize value of the transmitted file by accessing a filesize value of the transmitted file from the file system, wherein the file is in a portable executable file format comprising an operating system executable header containing relocation information, wherein the operating system executable header allows multiple segments of the file to be loaded at arbitrary memory addresses; and
compare the determined size of the transmitted file to the stored filesize value of the transmitted file;
determine, based on the comparison, that the determined size of the transmitted file is greater than the stored filesize value of the transmitted file;
execute, responsive to determining that the determined size of the file is greater than the stored filesize value of the transmitted file, steganography detection analytics on the transmitted file; and
in response to the steganography detection analytics indicating presence of steganography in the transmitted file:
execute a steganography remediation action, and
transmit information describing the steganography to a client device.

10. The non-transitory computer readable medium of claim 9, wherein the instructions that cause the at least one processor to determine the size of the transmitted file comprise instructions that cause the at least one processor to:
obtain a pointer to a section header of the transmitted file, the section header associated with a plurality of sections of the transmitted file;
for each section of the plurality of sections of the transmitted file, determine a size of the section; and
sum the size of each section of the plurality of sections of the transmitted file to determine the size of the transmitted file.

11. The non-transitory computer readable medium of claim 10, wherein the instructions that cause the at least one processor to obtain the pointer to the section header of the transmitted file comprise instructions that cause the at least one processor to:
open the transmitted file using a filename of the transmitted file or a path of the transmitted file;
read a header of the transmitted file;
retrieve a magic number from the header; and
verify the magic number to obtain a pointer to the section header of the transmitted file.

12. The non-transitory computer readable medium of claim 9, wherein the instructions that cause the at least one processor to execute the steganography detection analytics on the transmitted file comprise instructions that cause the at least one processor to:
identify an appended payload in the transmitted file;
analyze the appended payload to determine a file format of the appended payload; and
execute the steganography detection analytics based on the file format of the appended payload.

13. The non-transitory computer readable medium of claim 9, wherein the instructions that cause the at least one processor to execute the steganography detection analytics on the transmitted file comprise instructions that cause the at least one processor to:

identify an appended payload in the transmitted file; and
perform one or more of Monte Carlo approximation, entropy determination, serial coefficient analysis, arithmetic mean determination, Chi-Square determination, and standard deviation determination to determine whether data within the appended payload is encrypted.

14. The non-transitory computer readable medium of claim 9, wherein the instructions that cause the at least one processor to execute the steganography detection analytics on the transmitted file comprise instructions that cause the at least one processor to:

identify an appended payload in the transmitted file; and
identify presence of unauthorized data within the appended payload.

15. The non-transitory computer readable medium of claim 9, wherein the instructions that cause the at least one processor to execute the steganography detection analytics on the transmitted file comprise instructions that cause the at least one processor to:

identify an appended payload in the transmitted file; and
identify presence of assembly level or machine level instructions within the appended payload.

16. The non-transitory computer readable medium of claim 9, wherein the instructions that cause the at least one processor to execute the steganography remediation action comprise instructions that cause the at least one processor to:

terminate processing and transmission of the transmitted file; and
isolate the transmitted file.

17. A computer system comprising:
at least one computer processor; and
a non-transitory computer readable medium storing instructions that when executed by the at least one computer processor cause the at least one processor to:
detect a transmission of a file via a firewall, an operating system, or an e-mail system;
in response to detecting the transmission of the file:
store the transmitted file in a file system residing on physical storage media;
determine a size of the transmitted file, by retrieving size data from a plurality of sections within the transmitted file; and
retrieve, from the file system from a source other than the transmitted file, a stored filesize value of the transmitted file by accessing a filesize value of the transmitted file from the file system, wherein the file is in a portable executable file format comprising an operating system executable header containing relocation information, wherein the operating system executable header allows multiple segments of the file to be loaded at arbitrary memory addresses; and
compare the determined size of the transmitted file to the stored filesize value of the transmitted file retrieved by accessing the filesize value of the transmitted file from the file system;
determine, based on the comparison, that the determined size of the transmitted file is greater than the stored filesize value of the transmitted file;
execute, responsive to determining that the determined size of the transmitted file is greater being smaller than the stored filesize value of the transmitted file, steganography detection analytics on the transmitted file; and
responsive to the steganography detection analytics indicating presence of steganography in the transmitted file:
execute a steganography remediation action, and
transmit information describing the steganography to a client device.

18. The computer system of claim 17, wherein the instructions that cause the at least one computer processor to determine the size of the file comprise instructions that cause the at least one computer processor to:

obtain a pointer to a section header of the transmitted file, the section header associated with a plurality of sections of the transmitted file;
for each section of the plurality of sections of the transmitted file, determine a size of the section; and
sum the size of each section of the plurality of sections of the file to determine the size of the transmitted file.

19. The computer system of claim 18, wherein the instructions that cause the at least one computer processor to obtain the pointer to the section header of the transmitted file comprise instructions that cause the at least one computer processor to:

open the transmitted file using a filename of the transmitted file or a path of the transmitted file;
read a header of the transmitted file;
retrieve a magic number from the header; and
verify the magic number to obtain a pointer to the section header of the transmitted file.

20. The computer system of claim 17, wherein the instructions that cause the at least one computer processor to execute the steganography detection analytics on the transmitted file comprise instructions that cause the at least one computer processor to:

identify an appended payload in the transmitted file;
analyze the appended payload to determine a file format of the appended payload; and
execute the steganography detection analytics based on the file format of the appended payload.

* * * * *